(12) United States Patent
Smythe

(10) Patent No.: US 6,431,304 B1
(45) Date of Patent: Aug. 13, 2002

(54) THREE AXIS ADJUSTABLE AUTOMOTIVE FOOT CONTROLS

(75) Inventor: Lawrence Smythe, Capistrano, CA (US)

(73) Assignee: International Truck Intellectual Property Company, L.L.C., Warrenville, IL (US)

(*) Notice: Subject to any disclaimer, the term of this patent is extended or adjusted under 35 U.S.C. 154(b) by 4 days.

(21) Appl. No.: 09/773,126

(22) Filed: Jan. 31, 2001

(51) Int. Cl.$^7$ .................................................. G05G 1/14
(52) U.S. Cl. ........................... 180/334; 74/512; 74/513; 701/49
(58) Field of Search ............................ 180/334; 74/512, 74/513; 701/1, 49; 434/62, 71

(56) References Cited

U.S. PATENT DOCUMENTS

| | | | |
|---|---|---|---|
| 5,172,606 A | * 12/1992 | Dzioba et al. ................. | 74/512 |
| 5,384,704 A | 1/1995 | Snyder et al. | |
| 5,460,061 A | * 10/1995 | Redding et al. ............... | 74/512 |
| 5,927,154 A | * 7/1999 | Elton et al. .................... | 74/512 |
| 6,182,525 B1 | * 2/2001 | Bowers et al. ............... | 180/274 |
| 6,205,883 B1 | * 3/2001 | Bortolon ....................... | 74/512 |
| 6,247,381 B1 | * 6/2001 | Toelke et al. .................. | 74/512 |
| 6,301,993 B1 | * 10/2001 | Orr et al. ....................... | 74/512 |

FOREIGN PATENT DOCUMENTS

| | | |
|---|---|---|
| DE | 41 22 629 A1 * | 1/1993 |
| EP | 0 363 546 A1 * | 10/1988 |

* cited by examiner

*Primary Examiner*—Paul N. Dickson
*Assistant Examiner*—Ruth Ilan
(74) *Attorney, Agent, or Firm*—Jeffrey P. Calfa; Neil T. Powell; Dennis Kelly Sullivan

(57) ABSTRACT

A control pedal assembly for a vehicle. Two or more control pedals are engaged to a pedal mounting system base component through a number of components that are slideably engaged to one another. The construction and arrangement of the components that are slideably engaged to one another and the engagement of those components to the control pedals and the pedal mounting system base component is such that the position of at least two control pedals is adjustable relative to one another. One or more positioning actuators are engaged to the components that are slideably engaged to one another. The positioning actuators, when activated, slide the slideably engaged components relative to one another and thus change the position of one or more control pedals. One or more position control apparatus are connected to the positioning actuators so that an operator of the vehicle can activate the positioning actuators to adjust the position of the control pedals. Pedal driven components such as pedal position sensors and hydraulic master cylinders are flexibly linked to the systems of the vehicle so that the control pedals remain functional regardless of the position to which the operator has adjusted them.

32 Claims, 22 Drawing Sheets

THREE AXIS ADJUSTABLE AUTOMOTIVE FOOT CONTROLS

BACKGROUND OF THE INVENTION

This invention relates to control pedals for use in vehicles or models of portions of vehicles and systems for mounting those control pedals to vehicles or models of vehicles. The invention relates more specifically to control pedals and control pedal mounting systems which provide for adjustment of an initial position of the control pedals relative to other components of the vehicle or the model of a portion of the vehicle. The initial position of a control pedal being the position in which the control pedal is supported when not being acted upon by a user. Such position adjustable control pedals are known. Position adjustable control pedals may be selectively supported in any of a plurality of combinations of initial positions, each of which is a unique combination of position and orientation relative to other components of the vehicle or the model of the vehicle. Conventional control pedal mounting systems generally restrict control pedals against any motion other than operational motions. Operational motions are those motions which a control pedal is intended to undergo when a user acts on the control pedal to effect the system to which the control pedal is linked and thus control the vehicle. Often, pedal mounting systems for mounting position adjustable control pedals are configured in a manner such that, position adjustable control pedals are restricted against any motion other than operational motions in each of the plurality of combinations of position and orientation to which they can be adjusted. In fact, vehicles and models of vehicles are often configured such that the position adjustable pedals are operational when they are in each of the plurality of initial positions in which the position adjustable control pedals can be supported. Configurations of some control pedal mounting systems that are known enable positional adjustment of more position adjustable control pedals than do others. Each unique control pedal mounting system enables different numbers of directions of positional adjustment and different extents of positional adjustment of each position adjustable control pedal as compared to other configurations of control pedal mounting systems. Some control pedal mounting systems enable position adjustment of multiple pedals in multiple directions but do not allow for positional adjustment of the position adjustable control pedals relative to one another. Other control pedal mounting systems enable positional adjustment of multiple position adjustable control pedals relative to one another but only allow for positional adjustment of the position adjustable control pedals in one direction.

There are two applications in which position adjustable control pedals are particularly useful. Position adjustable control pedals are useful as operational control pedals in a vehicle. A vehicle which has position adjustable control pedals more readily lends itself to safe and comfortable use by drivers of various different physical proportions. The greater the adjustability of the control pedals of a vehicle the more likely it is that individuals of various different physical proportions will be able to comfortably and efficiently control the vehicle. The adjustability of the control pedals of a vehicle increases as the number of the control pedals of the vehicle which are position adjustable control pedals increases and as the number of directions in which the position of the position adjustable control pedals increases. Position adjustable control pedals are also useful as a tool when performing ergonomic studies to determine suitable locations for control pedals of a vehicle that is being designed. Models of a vehicle or portions of a vehicle may be built with position adjustable models of the control pedals of the vehicle. Ergonomic studies can be performed with these models by having individuals of various different proportions actuate one or more spatial arrangements of the control pedals of the model, and comment on the relative comfort and ease of operation of each of the spatial arrangements of the control pedals. Ergonomic studies to determine the relative merit of a control pedal configuration are also performed by having study participants test drive fully operational vehicles. Operational vehicles and vehicle models that are constructed with position adjustable control pedals allow study participants to operate and react to numerous different control pedal configurations which have different relative positioning of the control pedals. The use of fully operational vehicles that have position adjustable control pedals in such ergonomic studies makes it possible to have study participants operate and react to control pedal configurations of numerous different vehicles while operating only one vehicle. The effect of factors such as the configuration of other components of the vehicle and the brand of the vehicle upon the reaction of study participants to each of the control pedal configurations is therefore the same for each of the control pedal configurations. This allows for a more objective evaluation of the relative merit of each of the control pedal configurations. Use of position adjustable control pedals in vehicles and vehicle models for ergonomics studies is also far more economical and effective than providing a unique vehicle or model with control pedals which are not position adjustable for each different control pedal configuration.

SUMMARY OF INVENTION

As a result, an object of the present invention is to provide position adjustable control pedals with a relatively high degree of adjustability.

The present invention is a control pedal assembly that has two or more position adjustable control pedals. The position adjustable control pedals are mounted indirectly to a pedal mounting system base component. Each of the position adjustable control pedals is mounted directly to a series of slider components and reactor components that is fixedly engaged to the pedal mounting system base component. The series of slider components and reactor components that at least one of the position adjustable control pedals is mounted to is configured in a manner such that it enables adjustment of the initial position of the position adjustable control pedal in two or more directions. Each slider component of the one or more series of slider components and reactor components of the control pedal assembly is slideably engaged to a reactor component in a manner such that the two components are allowed to translate relative to one another along a respective adjustment curve only. Locking mechanisms may be engaged to each slideably engaged pair of a slider component and a reactor component. Each of the locking mechanisms may be selectively locked or unlocked to prevent or allow sliding relative movement of each slideably engaged slider component and reactor component along a respective adjustment curve. When a position adjustable control pedal is being actuated by a user it would generally be preferred that each of the locking mechanisms engaged to the series of slider components and reactor components that the respective position adjustable control pedal is mounted to be locked. This would ensure that the only relative motions that are allowed between the respective position adjustable control pedal and the pedal mounting system base component are the operational motions of the respective position adjustable control pedal.

A first position adjustable control pedal is mounted to the pedal mounting system base component through a first series of slider components and reactor components. The first position adjustable control pedal is mounted to a first slider in a manner such that the only relative motions that are allowed between the two components are the operational motions of the first position adjustable control pedal. The first slider is, in turn, slideably engaged to a first reactor component, in the manner describe above, such that relative translation between the first slider component and the first reactor component is allowed along a first adjustment curve only. A first locking mechanism may be engaged between the first slider component and the first reactor component as described above so that relative motion between the components along the first adjustment curve may be selectively allowed or prevented. A second slider component is fixedly engaged to or is the same component as the first reactor component. The second slider component is slideably engaged to a second reactor component, in the manner described above, such that relative translation between the components is only allowed along a second adjustment curve. A second locking mechanism may be engaged between the second slider component and the second reactor component as described above so that relative motion between the components along the second adjustment curve may be selectively allowed or prevented. The configuration of the first slider component, the first reactor component, the second slider component, and the second reactor component and the orientation in which all of these components are engaged to one another is such that the second adjustment curve extends in different directions than the first adjustment curve. The second reactor component is engaged directly or indirectly to the pedal mounting system base component. The construction of the engagement of the second reactor component to the pedal mounting system base component may be of many different forms. The second reactor component may be fixedly engaged to the pedal mounting system base component. The second reactor component may, in fact, be one and the same component as the pedal mounting system base component. The second reactor component may, alternatively, be engaged to the pedal mounting system base component in a manner allowing relative movement between the components. In such an instance where the second reactor component is moveably engaged to the pedal mounting system base component one or more locking mechanisms may be engaged between the two components. The locking mechanisms engaged between the second reactor component and the pedal mounting system base component would make it possible to selectively fix the position of the second reactor component relative to the, pedal mounting system base component. With the control pedal assembly so configured the initial position of the first position adjustable control pedal relative to the pedal mounting system base component can be adjusted in at least two directions which are dictated by the first adjustment curve and the second adjustment curve.

As was mentioned above, a second position adjustable control pedal is included in the invention. The second position adjustable control pedal is mounted to the pedal mounting system base component through a second series of slider components and reactor components in much the same way that the first position adjustable control pedal is mounted to the pedal mounting system base component. The second position adjustable control pedal is mounted to a third slider component in a manner such that the only relative motions allowed between the two components are the operational motions of the second position adjustable control pedal. The initial position of the second position adjustable control pedal is adjustable in at least one direction relative to the pedal mounting system base component. The first series of slider components and reactor components is at least partially independent of the second series of slider components and reactor components. The third slider component is free to move along a third adjustment curve completely independent of any motions of the first slider component along the first adjustment curve. Therefore, the initial position of the first position adjustable control pedal and the initial position of the second position adjustable control pedal are adjustable relative to and independent of one another. Thus, it can be seen that the above-mentioned object of the invention, as well as others not mentioned, have been met.

DRAWINGS

Other objects and advantages of the invention will become more apparent upon perusal of the detailed description thereof and upon inspection of the drawings in which.

DETAILS OF INVENTION

Figure 1:
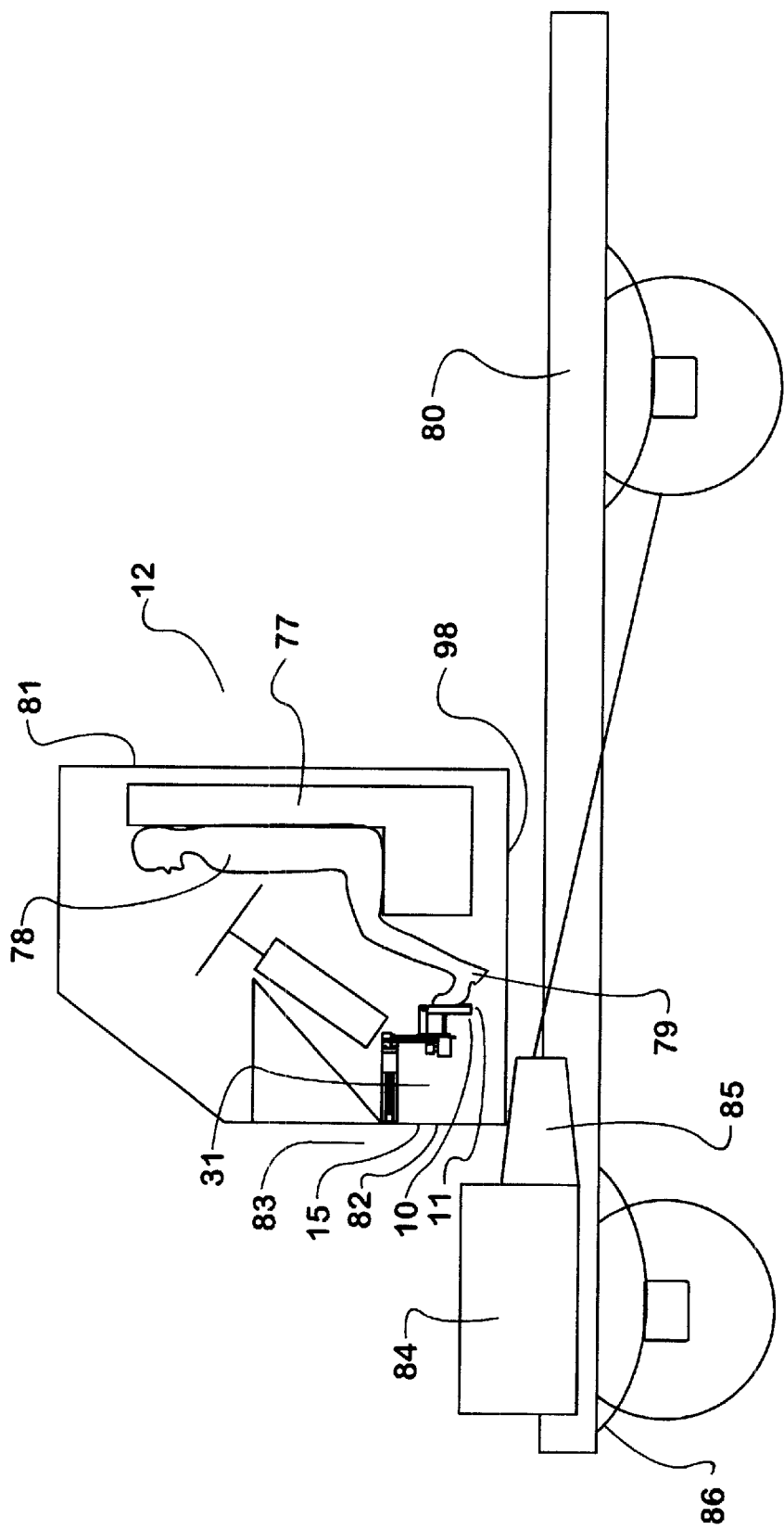
FIG. 1 is a side sectional view of a vehicle with the control pedal assembly of the present invention.
Figure 2:
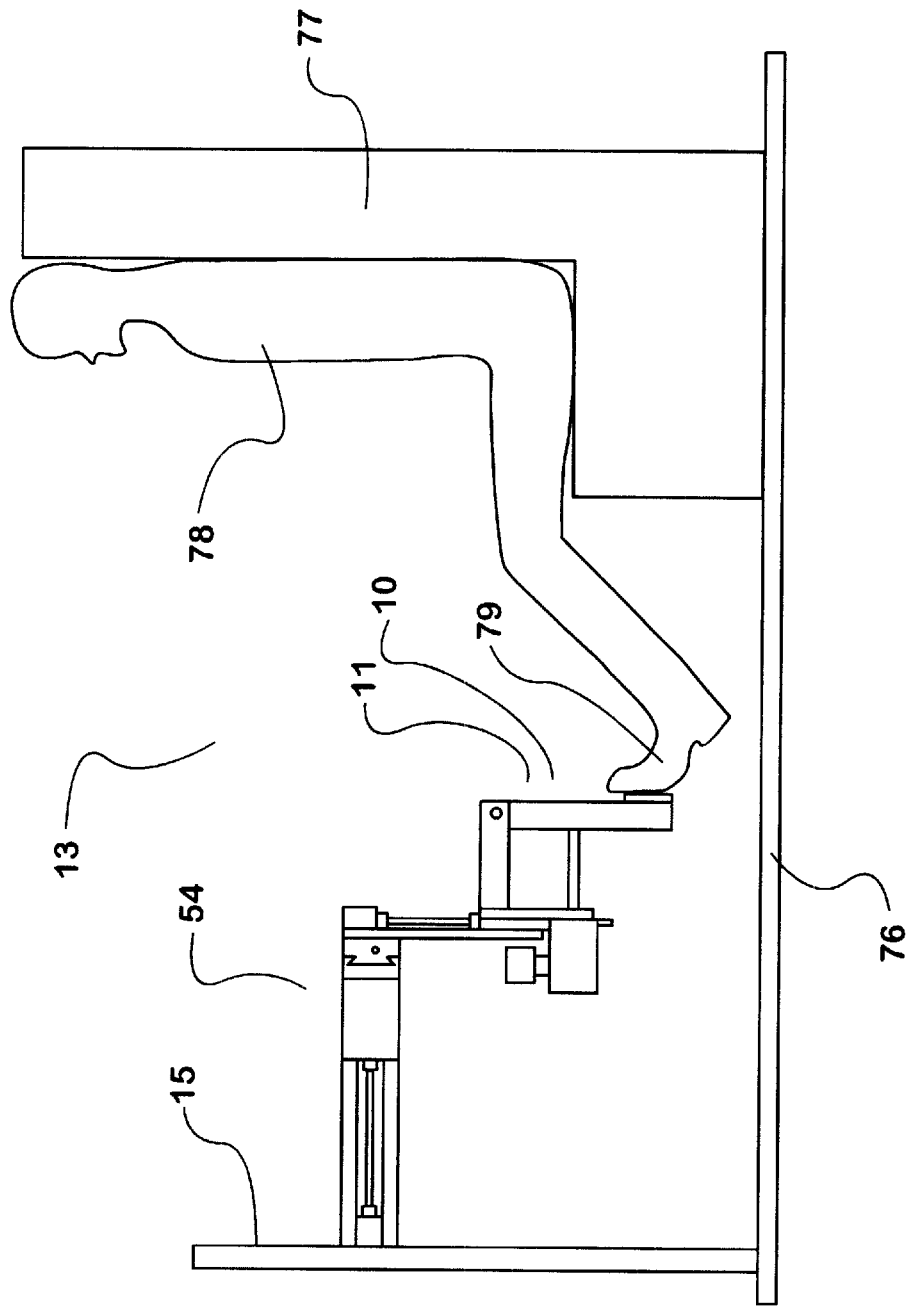
FIG. 2 is a side elevational view of a vehicle model with the control pedal assembly of the present invention.
Figure 3:
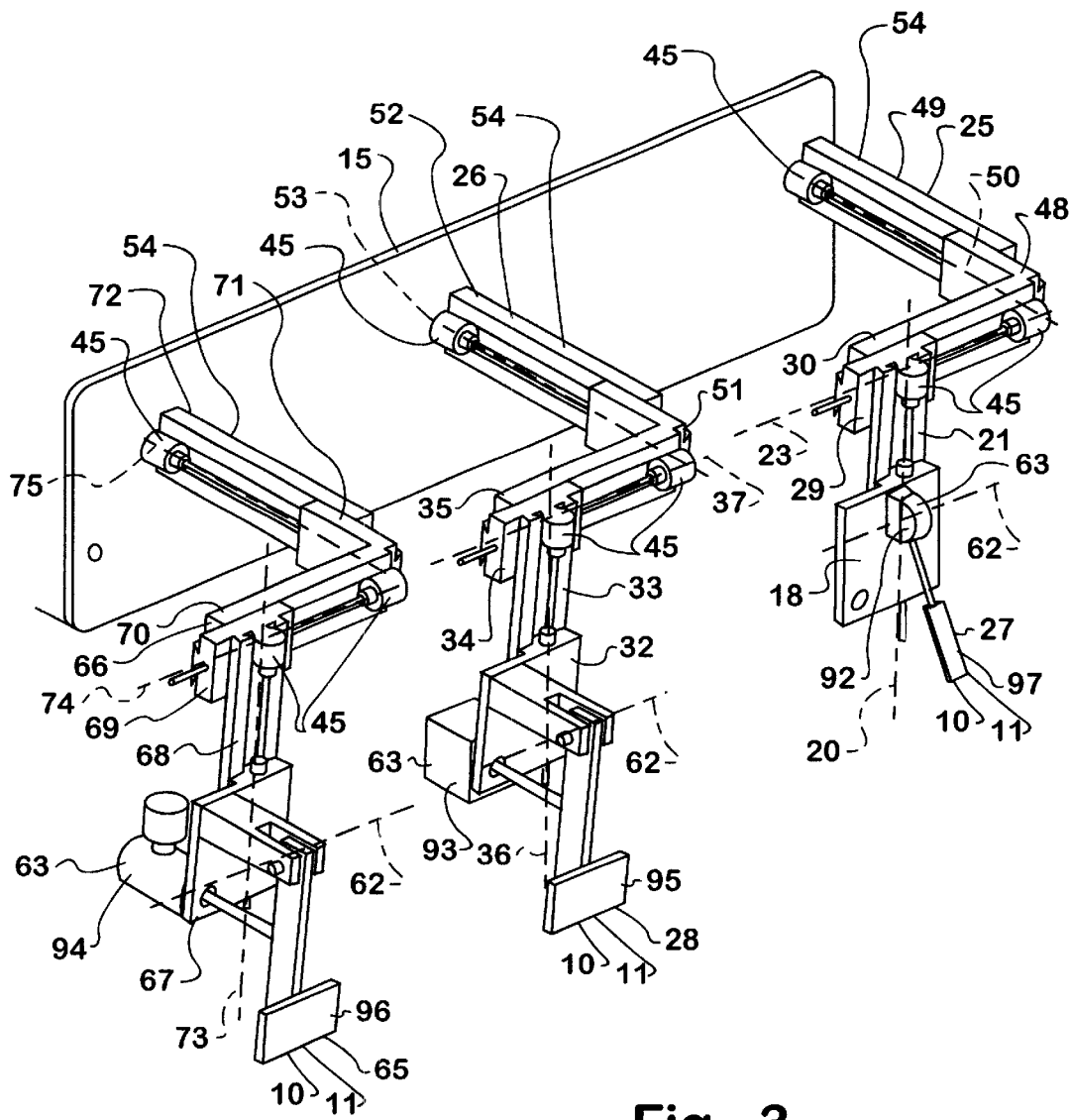
FIG. 3 is a perspective view of the control pedal assembly of the present invention.
Figure 4:
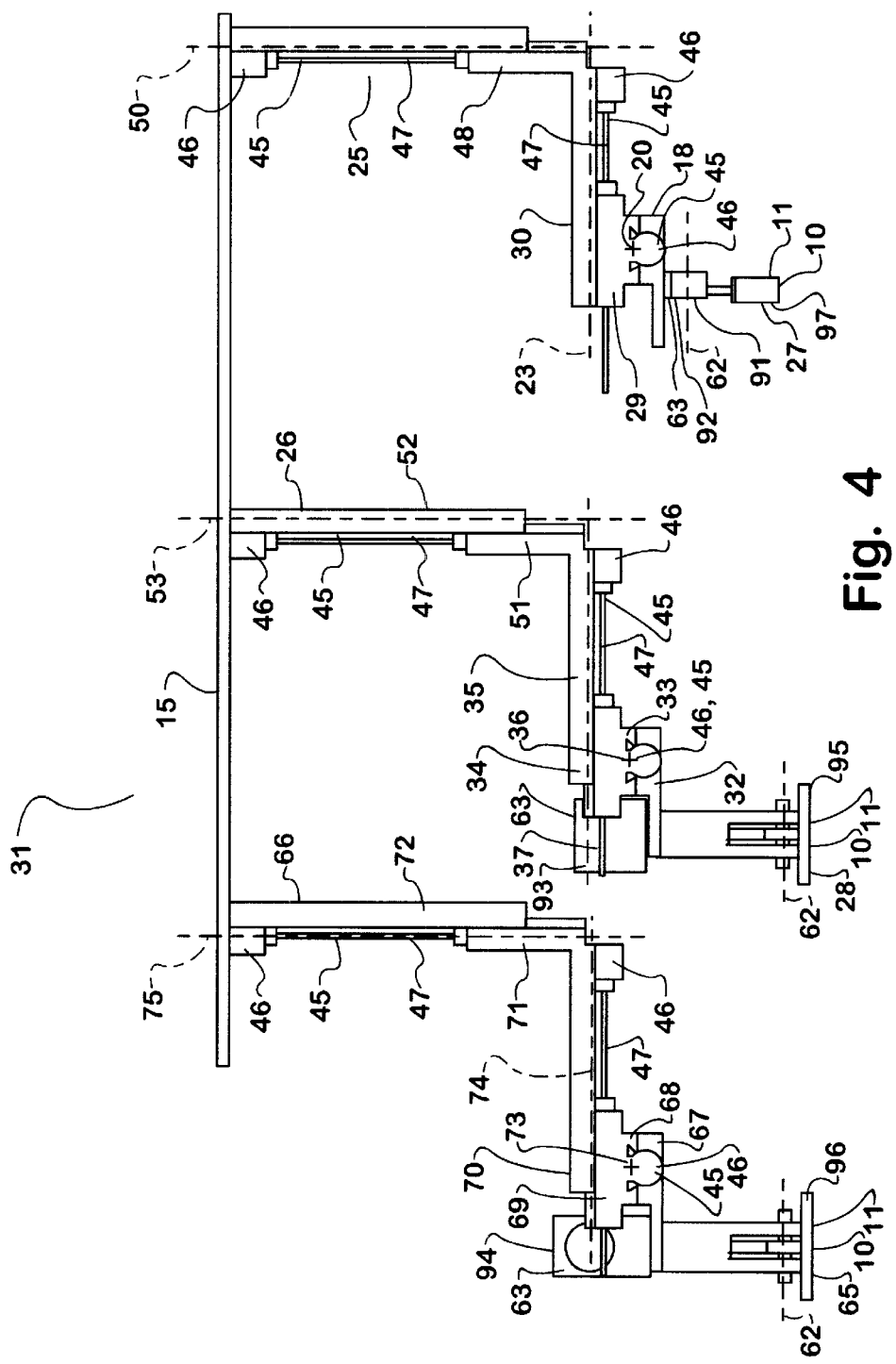
FIG. 4 is a plan view of the control pedal assembly of the present invention.
Figure 5:
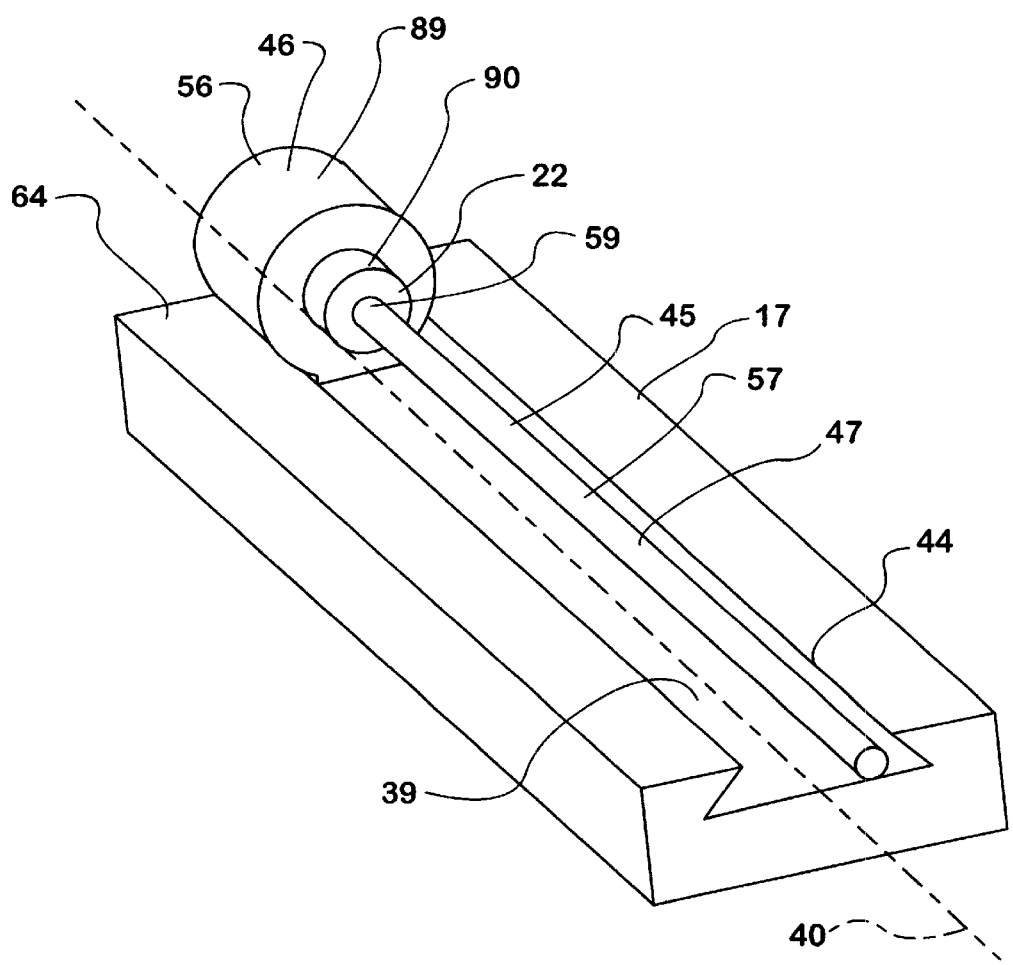
FIG. 5 is a perspective view of an embodiment of a reactor component of the present invention.
Figure 6:
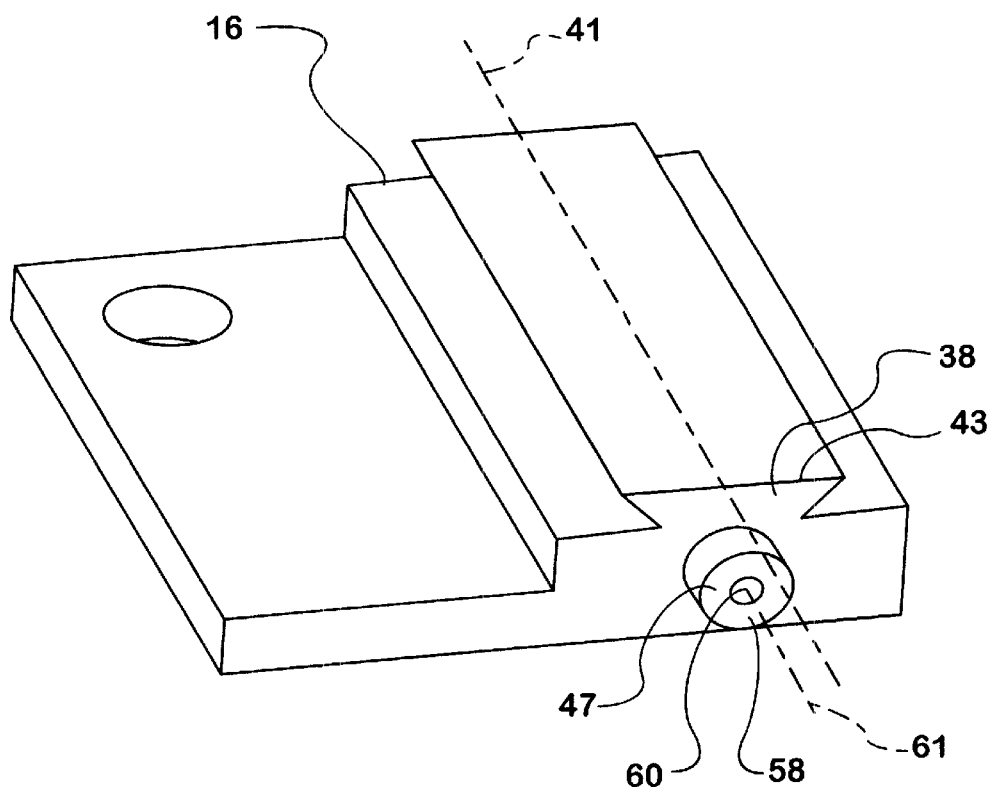
FIG. 6 is a perspective view of an embodiment of a slider component of the present invention.
Figure 7:
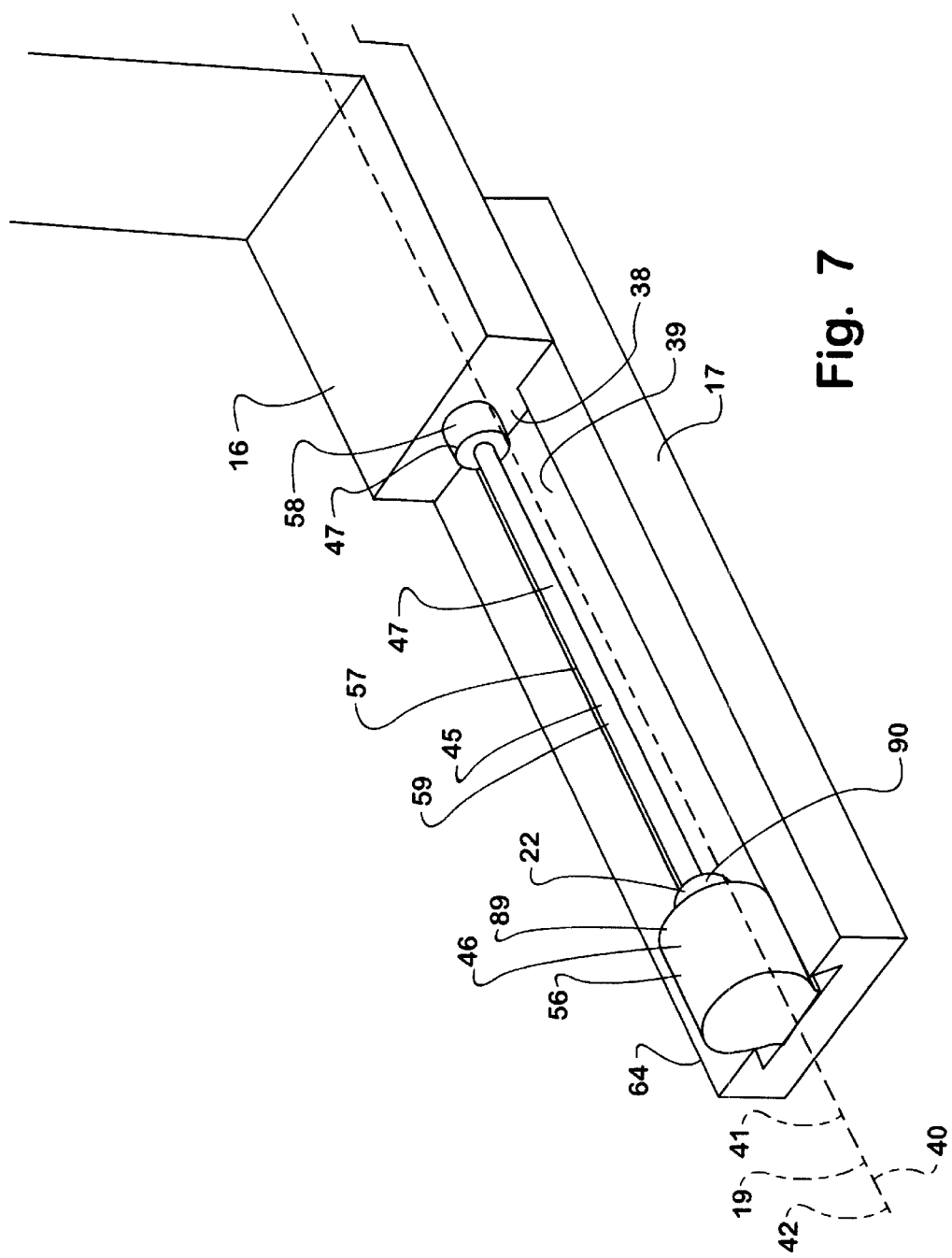
FIG. 7 is a perspective view of a slideably engaged slider component and reactor component with a positioning actuator engaged to them.
Figure 8:
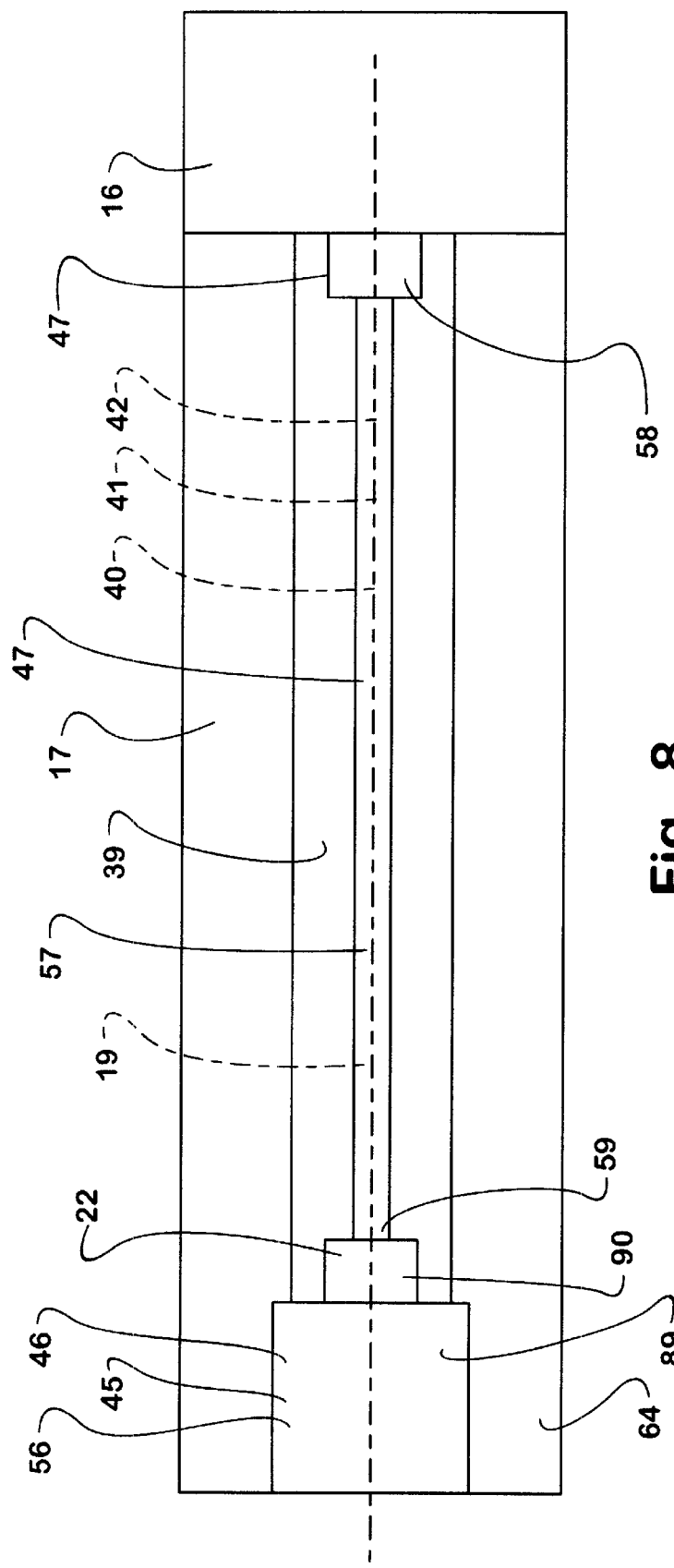
FIG. 8 is a plan view of a slideably engaged slider component and reactor component with a positioning actuator engaged to them.
Figure 9:
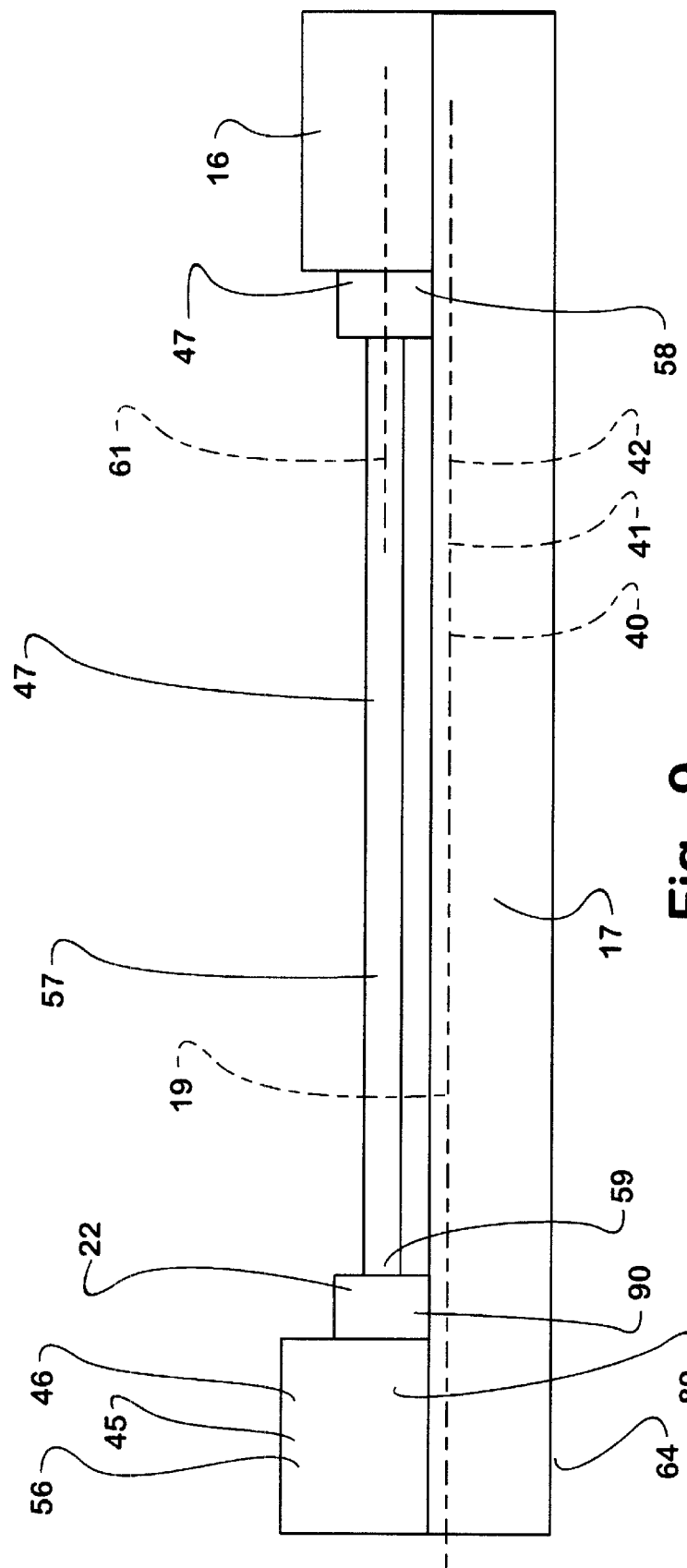
FIG. 9 is a side elevational view of a slideably engaged slider component and reactor component with a positioning actuator engaged to them.
Figure 10:
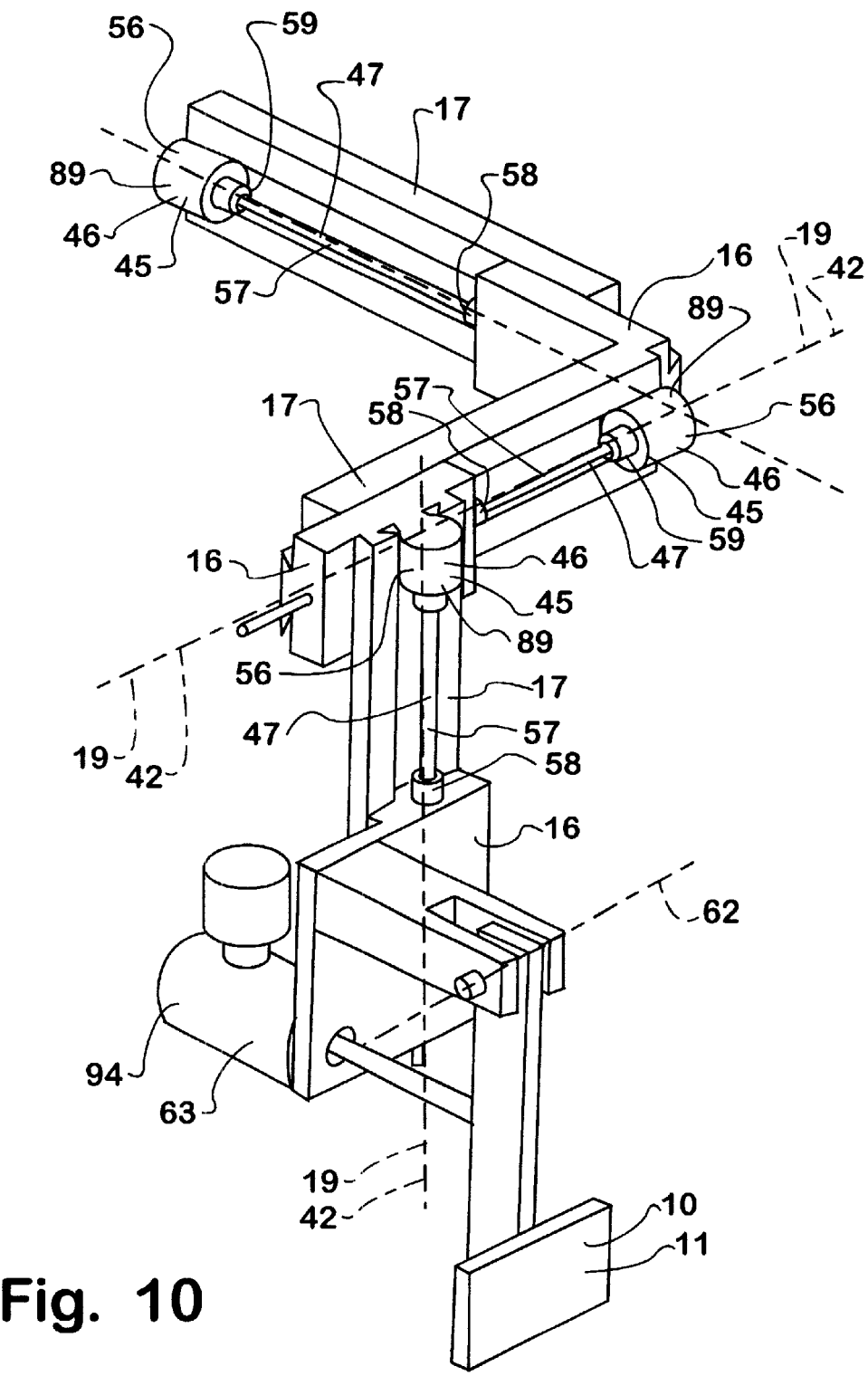
FIG. 10 is a perspective view of a series of slider components and reactor components.

The present invention is a control pedal assembly 31 comprising at least two position adjustable control pedals 11. The invention includes a pedal mounting system base component 15. The pedal mounting system base component 15 is usually designed to be engaged to a vehicle 12 or a vehicle model 13. A first series of slider components and reactor components 25 is mounted to the pedal mounting system base component 15. A first position adjustable control pedal 27 is mounted to the first series of slider components and reactor components 25. The first series of slider components and reactor components 25 is comprised of a first slider component 18, a first reactor component 21, a second slider component 29, and a second reactor component 30. The first slider component 18 and the first reactor component 21 are constructed and slideably engaged to one another in manner such that relative translation between the components is allowed only along a first adjustment curve 20. The second slider component 29 is either fixedly engaged to or is the same component as the first reactor component 21. The second slider component 29 and the second reactor component 30 are constructed and slideably engaged to one another in a manner such that relative translation between the components is allowed along a second adjustment curve 23 only. The first slider component 18, the first reactor component 21, the second slider component 29, and the second reactor component 30 are constructed and engaged to one another in an orientation such that the first adjustment curve 20 extends in different directions than does the second adjustment curve 23. The second reactor component 30 is either directly or indirectly mounted to the pedal mounting system base component 15, or may be one and the same component as the pedal mounting system base component 15. The first position adjustable control pedal 27 is mounted to the first slider component 18 in a manner such that operational motions of the first position adjustable control pedal 27 are the only relative motions allowed between the first position adjustable control pedal 27 and the first slider component 18. Operational motions of a control pedal 10 are those motions which the control pedal 10 is intended to undergo when an operator acts upon the control pedal 10 in the manner that such a control pedal 10 would be acted upon when controlling the vehicle 12. The most common operational motion that a control pedal 10 is designed to undergo during operation is rotation away from an operator about a control pedal pivot axis 62. A control pedal assembly 31 constructed as described above enables adjustment of the initial position of the first position adjustable control pedal 27 relative to the pedal mounting system base component 15 in at least two directions. The initial position of a position adjustable control pedal 11 being the position in which the control pedal is supported when not being acted upon by a user.

The control pedal assembly 31 of the present invention further includes a second position adjustable control pedal 28 mounted to the pedal mounting system base component 15. A second series of slider components and reactor components 26 is mounted to the pedal mounting system base component 15. The second series of slider components and reactor components 26 is comprised of a third slider component 32 and a third reactor component 33. The second position adjustable control pedal 28 is mounted to the second series of slider components and reactor components 26. The third slider component 32 and the third reactor component 33 are constructed and slideably engaged to one another in such a manner that relative translation between the components is allowed only along a third adjustment curve 36. The second position adjustable control pedal 28 is mounted to the third slider component 32 in a manner such that operational motions of the second position adjustable control pedal 28 are the only relative motions allowed between the second position adjustable control pedal 28 and the third slider component 32. The third reactor component 33 is engaged either directly or indirectly to the pedal mounting system base component 15, or may be one and the same component as the pedal mounting system base component 15. Thus, adjustment of the initial position of the second position adjustable control pedal 28 relative to the pedal mounting system base component 15 is enabled by the control pedal assembly 31. The third slider component 32 and the first slider component 18 may only be engaged to one another in ways that allow sliding of the third slider component 32 along the third adjustment curve 36 and sliding of the first slider component 18 along the first adjustment curve 20 completely independently of one another. Thus, the initial position of the first position adjustable control pedal 27 and the initial position of the second position adjustable control pedal 28 are adjustable relative to and completely independent of one another in at least one direction.

The control pedal assembly 31 may enable adjustment of the initial position of the second position adjustable control pedal 28 in at least two directions relative to the pedal mounting system base component 15. In this embodiment the second series of slider components and reactor components 26 further includes a fourth slider component 34 and a fourth reactor component 35. The fourth slider component 34 is either fixedly engaged to or is the same component as the third reactor component 33. The fourth slider component 34 and the fourth reactor component 35 are constructed and slideably engaged to one another in such a manner that relative translation between the components is only allowed along a fourth adjustment curve 37. The fourth reactor component 35 is either directly or indirectly engaged to the pedal mounting system base component 15, or may be one and the same component as the pedal mounting system base component 15. The third slider component 32, the third reactor component 33, the fourth slider component 34, and the fourth reactor component 35 are constructed and engaged to one another in an orientation such that the fourth adjustment curve 37 extends in different directions than does the third adjustment curve 36. Thus, as was mentioned above, a control pedal assembly 31 constructed as described enables adjustment of the initial position of the second position adjustable control pedal 28 in at least two directions relative to the pedal mounting system base component 15.

The control pedal assembly 31 may further enable adjustment of the initial position of the first position adjustable control pedal 27 in three directions relative to the pedal mounting system base component 15. The first series of slider components and reactor components 25 may be further comprised of a fifth slider component 48 and a fifth reactor component 49. The fifth slider component 48 is either fixedly engaged to or is the same component as the second reactor component 30. The fifth slider component 48 and the fifth reactor component 49 are constructed and slideably engaged to one another in such a manner that relative translation between the components is only allowed along a fifth adjustment curve 50. In the preferred embodiment, the fifth reactor component 49 is fixedly engaged to the pedal mounting system base component 15 or may be one and the same component as the pedal mounting system base component 15. The components of the first series of slider components and reactor components 25 are constructed and engaged to one another in an orientation such that the fifth adjustment curve 50 extends in different directions than do either of the first adjustment curve 19 and the second adjustment curve 23. Thus, as was mentioned above, a control pedal assembly 31 constructed as described enables adjustment of the initial position of the first position adjustable control pedal 27 in at least three directions relative to the pedal mounting system base component 15.

The control pedal assembly 31 may enable adjustment of the initial position of the second position adjustable control pedal 28 in three directions relative to the pedal mounting system base component 15. The second series of slider components and reactor components 26 may be further comprised of a sixth slider component 51 and a sixth reactor component 52. The sixth slider component 51 is either fixedly engaged to or is the same component as the fourth reactor component 35. The sixth slider component 51 and the sixth reactor component 52 are constructed and slideably engaged to one another in such a manner that relative translation between the components is only allowed along a sixth adjustment curve 53. In the preferred embodiment, the sixth reactor component 52 is fixedly engaged to the pedal mounting system base component 15, or may be one and the same component as the pedal mounting system base component 15. The components of the second series of slider components and reactor components 26 are constructed and engaged to one another in an orientation such that the sixth adjustment curve 53 extends in different directions than do either of the third adjustment curve 36 and the fourth adjustment curve 37. Thus, as was mentioned above, a control pedal assembly 31 constructed as described enables adjustment of the initial position of the second position adjustable control pedal 28 in at least three directions relative to the pedal mounting system base component 15.

Preferably, the first series of slider components and reactor components 25 and the second series of slider components and reactor components 26 are at least partially independent of one another. Some of the components of the first series of slider components and reactor components 25 may be engaged to some of the components of the second series of slider components and reactor components 26. For example the fourth slider component 34 and the second slider component 29 may be engaged to one another in any of a number of ways and may, in fact, be one and the same component. It is preferred, as mentioned above, that at least the first slider component 18 and the third slider component 32 be independently adjustable along the first adjustment curve 20 and the third adjustment curve 36 respectively. This allows for adjustment of the initial position of the first position adjustable control pedal 27 relative to the initial position of the second position adjustable control pedal 28 in an independent manner in at least one direction.

The control pedal assembly 31 may further include structure for mounting a third position adjustable control pedal 65. A third series of slider components and reactor components 66 would be mounted to the pedal mounting system base component 15. The third position adjustable control pedal 65 would be mounted to the third series of slider components and reactor components 66. The third series of slider components and reactor components 66 would be comprised of a seventh slider component 67, a seventh reactor component 68, an eighth slider component 69, an eighth reactor component 70, a ninth slider component 71, and a ninth reactor component 72. The seventh slider component 67 and the seventh reactor component 68 are constructed and slideably engaged to one another in manner such that relative translation between the components is allowed only along a seventh adjustment curve 73. The eighth slider component 69 would be either fixedly engaged to or the same component as the seventh reactor component 68. The eighth slider component 69 and the eighth reactor component 70 would be constructed and slideably engaged to one another in a manner such that relative translation between the components is allowed along an eighth adjustment curve 74 only. The ninth slider component 71 would be either fixedly engaged to or the same component as the eighth reactor component 70. The ninth slider component 71 and the ninth reactor component 72 would be constructed and slideably engaged to one another in a manner such that relative translation between the components is allowed along a ninth adjustment curve 75 only. The seventh slider component 67, the seventh reactor component 68, the eighth slider component 69, the eighth reactor component 70, the ninth slider component 71, and the ninth reactor component 72 would be constructed and engaged to one another in an orientation such that each of the seventh adjustment curve 73, the eighth adjustment curve 74, and the ninth adjustment curve 75 extend in different directions relative to one another. In the preferred embodiment the ninth reactor component 72 would either be fixedly engaged to the pedal mounting system base component 15, or be one and the same component as the pedal mounting system base component 15. The third position adjustable control pedal 65 would be mounted to the seventh slider component 18 in a manner such that operational motions of the third position adjustable control pedal 65 were the only relative motions allowed between the third position adjustable control pedal 65 and the seventh slider component 67. A control pedal assembly constructed as described above enables adjustment of the initial position of the third position adjustable control pedal 65 relative to the pedal mounting system base component 15 in at least three directions.

As was mentioned above, locking mechanisms 22 are preferably engaged to the respective slider component 16 and the respective reactor component 17 of a pair of a slider component 16 and a reactor component 17 that are slideably engaged. The purpose of the locking mechanisms 22 is to ensure that each slideably engaged slider component 16 and reactor component 27 are prevented from translating relative to one another once the initial position of each position adjustable control pedal 11 is adjusted to the position that a user desires. This ensures that when each position adjustable control pedal 11 is being actuated, motions other than the operational motions of the position adjustable control pedal 11 are prevented.

Each pair of a slider component 16 and a reactor component 17 which are slideably engaged to one another may have any of a number of different types of structure for engaging the two components in a slideable manner. One or mores slide members 38 are engaged to the slider component 16 and/or the reactor component 17 of each slideably engaged pair of a slider component 16 and a reactor component 17. The slider component 16 defines a complimentary slide recess 39 for each slide member 38 that is engaged to the reactor component 17. The reactor component 17 defines a complimentary slide recess 39 for each slide member 38 that is engaged to the slider component 16. When a pair of a slider component 16 and a reactor component 17 are slideably engaged to one another the one or more slide members 38 are disposed within the respective slide recesses 39. In the preferred embodiment each slide member 38 is engaged to a slider component 16 and each reactor component 17 defines a slide recess 39.

The shape of the adjustment curve 42 along which a slideably engaged slider component 16 and reactor component 17 translate relative to one another is dictated by the shape of the one or more slide members 38 and the one or more slide recesses 39. A slide recess central axis 40 extends through the center of each slide recess 39. The slide recesses 39 of each slideably engaged slider component 16 and reactor component 17 have a shape and orientation such that their slide recess central axes 40 are disposed parallel to one another. A slide member central axis 41 extends through the center of each slide member 38. The slide members 38 of each slideably engaged slider component 16 and reactor component 17 have a shape and orientation such that their slide recess member central axes 40 are disposed parallel to one another. Each of the slide recess central axes 40 and the slide member central axes 41 have the same constant radius of curvature that is usually infinite as the slide recess central axes 40 and the slide member central axes 41 are usually linear. The adjustment curve 42 of a respective slideably engaged slider component 16 and reactor component 17 extends parallel to the slide member central axes 41 and the slide recess central axes 40 of the slideably engaged slider component 16 and reactor component 17.

Each slideably engaged slider component 16 and reactor component 17 must be constructed and engaged to one another in a manner such that sliding translation along a respective adjustment curve 42 is the only respective motion allowed between the two components. Relative translation of each slideably engaged slider component 16 and reactor component 17 in directions perpendicular to a respective adjustment curve 42 must be prevented. Each slideably engaged slider component 16 and reactor component 17 may be constructed and engaged to one another in any of a number of ways easily imagined by one skilled in the art that would accomplish this function. In the preferred embodiment cross-sections of slide members 38 perpendicular to their slide member central axes 41 are only slightly smaller than cross-sections of respective slide recesses 39 perpendicular to their slide recess central axes 40. A slideably engaged slider component 16 and reactor component 17 must also be prevented from rotating relative to one another about any axis. Each slideably engaged slider component 16 and reactor component 17 may be constructed and engaged to one another in any of a number of ways easily imagined by one skilled in the art that would accomplish this function. In the preferred embodiment a single slide member 38 of constant trapezoidal cross-section is engaged to each slider component 16. In this embodiment, a single slide recess 39 of a constant trapezoidal cross-section that is only slightly larger than the cross-section of the slide member 38 is defined by each reactor component 17. In this embodiment, the wider portion of each slide member 38 is disposed at a free end 43 of the slide member. Also in this embodiment the narrower portion of each slide recess 39 is disposed at an outer side 44 of the slide recess 39. Thus, the slide member 38 is retained within the slide recess 39. A slideably engaged slider component 16 and reactor component 17 comprised of such a trapezoidal slide member 38 disposed within such a trapezoidal slide recess 39 are prevented from moving relative to one another other than sliding along a respective adjustment curve 42. In the preferred embodiment each slide member central axis 41, each slide recess central axis 40, and thus each respective adjustment curve 42 is in the form of a straight line.

In the preferred embodiment, each of the slider components 16 of the control pedal assembly 31 is moveable along a respective adjustment curve 42 independently of all other slider components 16. In this embodiment the first reactor component 21, the second reactor component 30, the third reactor component 33, and the fourth reactor component 35 are all separate unique components that are engaged to one another only through intermediate engagement to the slider components 16 of the control pedal assembly 31. Likewise, the first slider component 18, the second slider component 29, the third slider component 32, the fourth slider component 34, the fifth slider component 48, and the sixth slider component 51 are separate unique components that are only engaged to one another through intermediate engagement to reactor components 17. This construction allows for adjustment of the initial position of the first position adjustable control pedal 27 relative to and independent of the initial position of the second position adjustable control pedal 28 in at least three directions.

As was mentioned above, each of the respective adjustment curves 42 preferably extends in different directions than do the other adjustment curves 42 of each respective series of slider components and reactor components 54. As was also mentioned above, the directions in which each respective adjustment curve 42 extends are determined by the orientation of the slide member central axes 40 and the slide recess central axes 41 of each respective slideably engaged slider component 16 and reactor component 17. Each series of slider components and reactor components 54 should, therefore, be constructed such that the slide member central axes 40, of each slideably engaged slider component 16 and reactor component 17, are oriented at an angle to slide member central axes 40 of other slideably engaged slider components 16 and reactor components 17. As mentioned above, in the preferred embodiment, each slide member central axis 40 is in the shape of a straight line. Preferably, the slide member central axes 40 of each slideably engaged slider component 16 and reactor component 17 are oriented substantially perpendicular to the slide member central axes of other slideably engaged slider components and reactor components of a series of slider components 16 and reactor components 17. Thus, the adjustment curves 42 of each series of slider components and reactor components 54 are disposed substantially perpendicular to one another.

The control pedal assembly 31 may include one or more positioning actuators 45. Each of the positioning actuators 45 of the control pedal assembly 31 would be engaged to a slider component 16 and a reactor component 17 that are slideably engaged. Each positioning actuator 45 would be an assembly of components which would, when activated, simultaneously apply a sliding force to a slider component 16 to which it is engaged and applying a reaction force to a reactor component 17 to which it is engaged. The sliding force that the positioning actuator 45 applies to a respective slider component 16 would be a force in a direction substantially parallel to the adjustment curve 42 of the slider component 16 and the reactor component 17 to which it is slideably engaged. The reaction force would be a force that the positioning actuator 45 applies to the reactor component 17, to which it is engaged, in a direction substantially opposite the direction that the sliding force is applied to the slider component 16 to which the positioning actuator is engaged. Each positioning actuator 45 would be comprised of a motivating device 46 and connecting linkages 47 between the motivating device 46 and the slider component 16 and reactor component 17 to which the positioning actuator 45 is engaged. The motivating device 46 of each positioning actuator 45 may be one of many different types of devices. Some, types of devices which would work as motivating devices 46 include but are not limited to rotational electric motors of numerous varieties, linear electric motors, and pneumatic and hydraulic cylinders. The connecting linkages 47 could also be constructed of a number of different designs. The only design requirement of the connecting linkages being that they are capable of transferring the driving force of the motivating device 46 to the slider component 16 and reactor component 17 in the form of the sliding force and reaction force described above. Preferably the driving direction of the motivating device 46 of each positioning actuator 45 can be selectively reversed so that the slideably engaged slider component 16 and reactor component 17 can be driven in both directions relative to one another along a respective adjustment curve 42. Each positioning actuator 45 also preferably includes the locking mechanisms 22 of the control pedal assembly 31. The locking mechanisms 22 would preferably be engaged to the other components of the positioning actuator 45 in such a manner that the components of the positioning actuator 45 are prevented from moving substantially relative to one another unless the motivating device 46 is activated. In the preferred embodiment, the locking mechanisms 22 of the control pedal assembly 31 are friction brakes 90 engaged to the motivating devices 46 of the positioning actuators 45. With the locking mechanisms 22 engaged to the control pedal assembly 31 in such a manner, motion other than operational motions of each of the position adjustable control pedals 11 is prevented unless one of the motivating devices 46 of the positioning actuators 45 is activated.

Each positioning actuator 45 is linked to a position control apparatus 55 that enables a user of the control pedal assembly 31 to controllably activate the respective position actuator 45. The construction of a position control apparatus 55 is dependent upon, among other factors, the construction of each of the position actuators 45 that are linked to the position control apparatus 55. A position control apparatus 55 may be comprised of various valves, switches, levers, buttons, etc. that may be interconnected in numerous different ways to allow a user of the control pedal assembly to selectively activate various ones of the motivating devices 46 of the positioning actuators 45. The construction of the position control apparatus 55 and the other components of the control pedal assembly 31 would be such that a user can also select the direction in which each positioning actuator 45 is activated. Thus, the user can control the direction that each positioning actuator 45 drives a slideably engaged slider component 16 and reactor component 17 relative to one another. A position control apparatus 55 may also be comprised of one or more microprocessors linked to the various valves, switches, levers, buttons, etc. of the position control apparatus 55 and operating according to algorithms encoded in one or more computer programs.

The motivating devices 46 of the positioning actuators 45 of the control pedal assembly 31 may be rotary electric servomotors 56. The connecting linkage 47 between the rotary electric servomotors 56 may be of many different designs. In the preferred embodiment the connecting linkage 47 of each of the positioning actuators 45 is comprised of a threaded shaft 57 and a driven nut 58. The rotary electric servomotor 56 of each positioning actuator 45 would be mounted to either a slider component 16 or a reactor component 17 of a slideably engaged pair of a slider component 16 and reactor component 17. The driven nut 58 would be engaged to whichever of the slider component 16 and the reactor component 17 that the rotary electric servomotor 56 is not mounted to. The driven nut 58 may, in fact, be an integral part of either the slider component 16 or the reactor component 17. The threaded shaft 57 would be engaged to an output shaft 59 of the rotary electric servomotor 56. The driven nut 58 would define a threaded bore 60 through itself. The threaded shaft 57 is also threadingly engaged within the threaded bore 60 of the driven nut 58. The driven nut 58 is engaged to either the slider component 16 or the reactor component 17, as described above, in a manner preventing relative rotation between the driven nut 58 and the component to which it is engaged about a bore axis 61. Thus, when the rotary electric servomotor 56 were activated the threaded shaft 57 would be driven rotationally by the output shaft 59 of the rotary electric servomotor 56, and the driven nut 58 would be driven along the threaded shaft 57. Thus, the sliding force would be applied to the slider component 16, the reaction force would be applied to the reactor component 17, and the slider component 16 and reactor component 17 would translate relative to one another along a respective adjustment curve 42. In the preferred embodiment, each rotary electric servomotor 56 is fixedly engaged at an end portion 64 of a reactor component 17. In this embodiment, the output shaft 59 of the rotary electric servomotor 56 is disposed substantially parallel to the slide recess central axes 40 of the slide recesses 39 of the slideably engaged slider component 16 and reactor component 17 to which the positioning actuator 45 is engaged. Each of the rotary electric servomotors 56, and the position control apparatus 55 to which they are linked are constructed in such a manner that a user of the control pedal assembly 31 can selectively cause the rotary electric servomotor 56 to drive in either a clockwise or counterclockwise direction. Thus, a user can operate the position control apparatus 55 and cause the positioning actuator 45 to selectively drive the slideably engaged slider component 16 and reactor component 17 in either direction relative to one another along a respective adjustment curve 42. In the preferred embodiment, a friction brake is engaged directly or indirectly to the output shaft 59 of the rotary electric servomotor 56 and prevents rotation of the output shaft 59 when the rotary electric servomotor 56 is not activated. This prevents the slideably engaged slider component 16 and reactor component 17 from translating relative to one another unless the rotary electric servomotor 56 is activated.

The range of adjustment of a position adjustable control pedal 11 in directions parallel to a respective adjustment curve 42 is limited to the sliding distance of a pair of a slider component 16 and a reactor component 17 that are slideably engaged along the respective adjustment curve 42. The sliding distance being the distance along a respective adjustment curve 42 that a pair of a slider component 16 and a reactor component 17 that are slideably engaged can be slideably translated relative to one another. The length and relative positioning of the one or more slide members 38 and the one or more slide recesses 39 effects the sliding distance of a given pair of a slider component 16 and reactor component 17 that are slideably engaged. If a pair of a slider component 16 and a reactor component 17 that are slideably engaged are slideably translated relative to one another far enough in either direction the one or more slide members 38 will slide out of engagement with the one or more slide recesses 39. The sliding distance is limited to the maximum distance that a respective pair of a slider component 16 and a reactor component 17 can be slideably translated relative to one another while maintaining proper engagement of the respective slide members 38 and the respective slide recesses 39. Thus, in general, the longer the slide recesses 39 and slide members 38 of a slideably engaged slider component 16 and reactor component 17 the greater the sliding distance of that slideably engaged slider component 16 and reactor component 17.

The sliding distance of a pair of a slider component 16 and a reactor component 17 that are slideably engaged may be further limited. A slider component 16 and a reactor component 17 that are slideably engaged may each have one or more travel-limiting surfaces 87. These travel-limiting surfaces 87 would be surfaces disposed at an angle relative to the adjustment curve 42 of the slideably engaged slider component 16 and reactor component 17. Travel-limiting surfaces 87 of a slideably engaged slider component 16 and reactor component 17 are positioned such that when the slider component 16 and reactor component 17 are slideably translated relative to one another the travel-limiting surfaces 87 eventually abut one another. When the travel-limiting surfaces 87 abut one another the slider component 16 and reactor component 17, that the abutting travel-limiting surfaces 87 are disposed on, are prevented from slideably translating any further relative to one another in one direction. Travel-limiting surfaces 87 may, thus, limit sliding distance to a greater extent than limitations in how far the slider component 16 and reactor component 17 can be slideably translated before the slide members 38 slide out of engagement with the slide recesses 39. A slider component 16 and reactor component 17 that are slideably engaged may have travel-limiting surfaces 87 that limit slideable translation of the two components in both directions.

The distance that a pair of a slider component 16 and a reactor component 17 that are slideably engaged may be slideably translated relative to one another by a positioning actuator 45 may be limited by an adjustment limiting system. The adjustment limiting system for each slideably engaged slider component 16 and reactor component 17 would include the positioning actuator 45 that is engaged to the slideably engaged slider component 16 and reactor component 17 directly or indirectly electrically linked to one or more limit switches. The adjustment limiting system may further include one or more of the position control apparatus 55 of the control pedal assembly 31 directly or indirectly electrically linked to one or more of the limit switches. The limit switches would be engaged to a slider component 16 and/or a corresponding slideably engaged reactor component 17. The construction of the adjustment limiting system may be of many different designs that are well known as long as the adjustment limiting system provides the appropriate functionality. When a slideably engaged slider component 16 and reactor component 17 are positioned relative to one another within an intended range of relative positions each of the limit switches associated with that slider component 16 and reactor component 17 assume an enabling operational state (open or closed). The enabling operational state of some of the limit switches may be open while the enabling operational state of other limit switches is closed. Alternatively, the enabling operational state of all of the limit switches may be the same (open or closed). When the limit switches are in this enabling operational state, activation of the positioning actuator 45 that is engaged to the slideably engaged slider component 16 and reactor component 17 is allowed in either direction. When a slideably engaged slider component 16 and reactor component 17 slideably translate to an outer bound of the intended range of relative positions the operational state (open or closed) of one or more of the limit switches changes from the enabling operational state to an opposite disabling operational state. When one or more of the limit switches of an adjustment limiting system of a slideably engaged pair of a slider component 16 and a reactor component 17 are in the disabling operational state, activation of the respective positioning actuator 45 is disabled in one direction. In such a case activation of the positioning actuator 45 in a direction that would slideably translate the slideably engaged slider component 16 and reactor component 17 to a relative position outside the intended range of relative positions is disabled. In other words, as a positioning actuator 45 drives a slideably engaged slider component 16 and reactor component 17 the slider component 16 and reactor component 17 eventually reach a relative position that is at an outer bound of an intended range of relative positions. When this happens the adjustment limiting systems disables activation of the respective positioning actuator 45 in the direction that the positioning actuator 45 drove the slideably engaged slider component 16 and reactor component 17 to the outer bound of the intended range of relative positions.

The size of the range through which the initial position of each of the position adjustable control pedals 11 may be adjusted in various directions is determined by limits of adjustment along respective adjustment curves 42 and the orientation of the respective adjustment curves 42 as described above. The appropriate size of the ranges of adjustment of the initial position of each of the position adjustable control pedals 11 is effected by many factors related to the design of the rest of the vehicle 12 or vehicle model 13. In general, however, the greater the range of adjustment of the initial position of each of the position adjustable control pedals 11 the better.

The one or more position control apparatus 55 may include a position control computer 88 controllably linked to one or more of the positioning actuators 45 of the control pedal assembly 31. The position control computer 88 would include control devices that a user can operate to control the position control computer 88. The control devices are generally switches levers and buttons such as are present on a keyboard, a computer mouse, or other computer control devices well known. The control devices could further include audio input devices such as microphones through which the position control computer 88 could receive operator commands. The position control computer 88 may be the only position control apparatus 55 of the control pedal assembly 31 or it may, alternatively, be one of a plurality of position control apparatus 55 of the control pedal assembly 31. Position control apparatus 55 other than the position control computer 88 may be controllably linked to the same positioning actuators 45 that the position control computer 88 is controllably linked to. In such a case a user of the control pedal assembly 31 may control the respective positioning actuators 45 by using either the position control computer 88 or the other control apparatus 55 that are controllably linked to the positioning actuators 45. The present invention further includes a computer program embodied in a computer readable medium. The position control computer 88 would operate according to the algorithm of the computer program of the present invention. The computer program of the present invention causes the position control computer 88 to perform a number of useful functions at the command of a user of the control pedal assembly 31. A flow chart showing the algorithm of the computer program of the present invention is shown in FIGS. 11A–11H Some of the more basic and important functions that the computer program causes the position control computer 88 to perform are positional control and tracking of the position of each of the position adjustable control pedals 11. For each position to which each position adjustable control pedal 11 can be adjusted there is a set of position coordinates that describes that position. For instance, in the preferred embodiment, lateral, longitudinal, and vertical position coordinates, the units of which are linear units of distance such as millimeters, define the position of each position adjustable control pedal 11. The computer program of the invention causes the position control computer 88 to repeatedly determine the position coordinates of each position adjustable control pedal 11 any time the position control computer 88 is operating according to the computer program of the present invention. The computer program also causes the position control computer 88 to display the position coordinates that each position adjustable control pedal 11 was located at when the position control computer 88 last determined the position coordinates of the position adjustable control pedals 11. The position control computer 88 may determine the position coordinates of the position adjustable control pedals 11 in any of a number of ways. The control pedal assembly 31 may have one or more position sensors that provide signals to the position control computer 88 that can be interpreted by the position control computer 88 to determine the relative position of a slideably engaged slider component 16 and reactor component 17. Any of a number of types of position sensors that are well known may be used to enable the position control computer 88 to determine the relative position of various slideably engaged slider components 16 and reactor components 17. Potentiometers and optical sensors are some, but not all, of the types of position sensors that could be employed in this application. The computer program of the current invention causes the position control computer 88 to calculate the position coordinates of each position adjustable control pedal 11 based upon the relative position of each slideably engaged slider component 16 and reactor component 17.

Figure 11A:
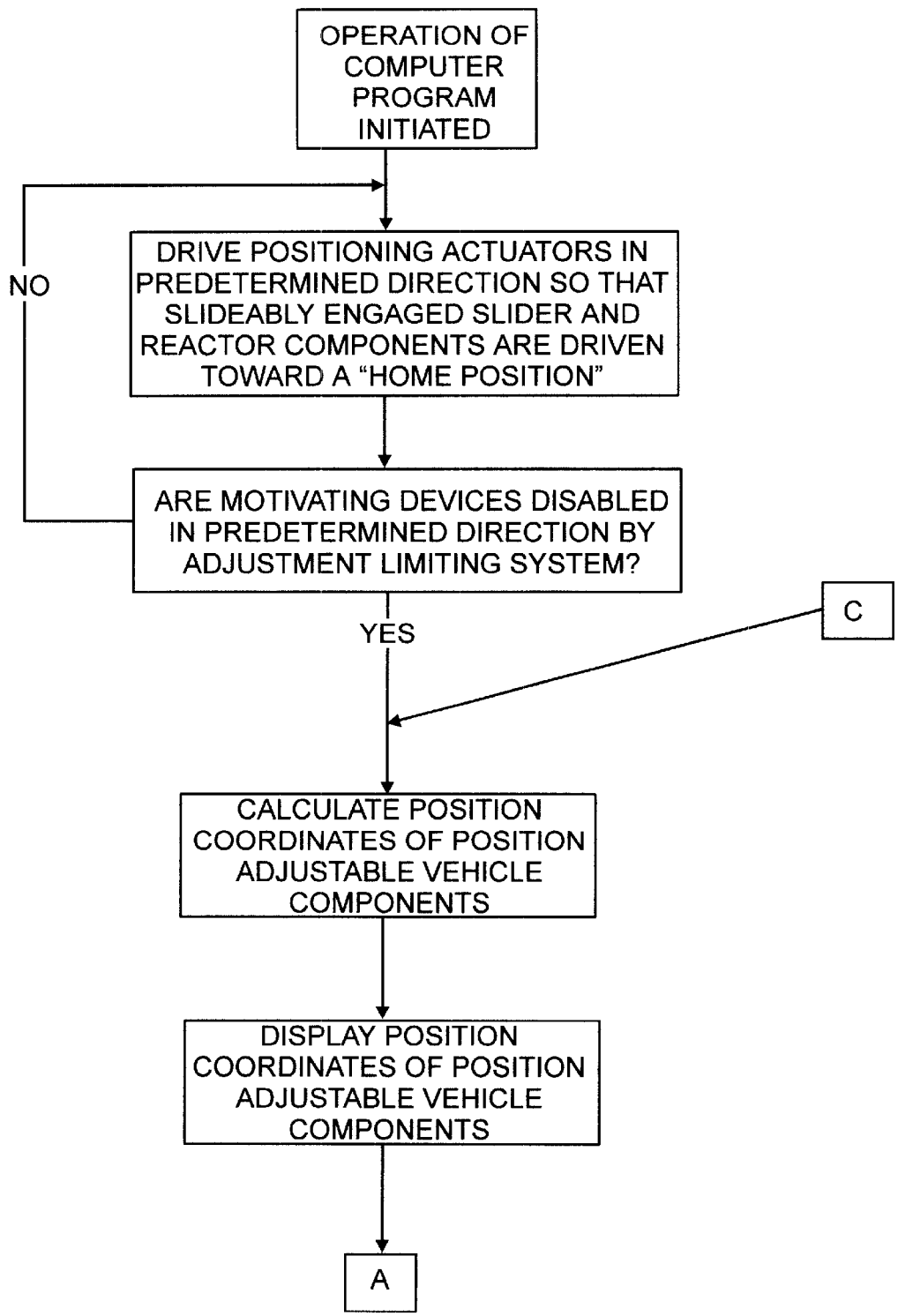
FIG. 11A is a beginning of a flow chart showing the beginning of the algorithm for the computer program of the present invention.
Figure 11B:
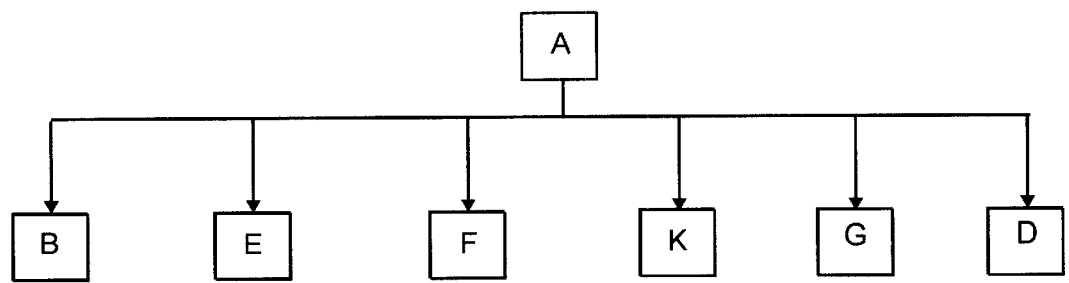
FIG. 11B is a portion of the flow chart of FIG. 11A that shows how the algorithm of the computer program of the present invention branches off into various processes.

As is best shown in FIG. 11A the position control computer 88 may, alternatively, determine the relative position of each slideably engaged slider component 16 and reactor component 17 by driving each slideably engaged slider component 16 and reactor component 17 to a home position and then keeping track of directions and magnitudes of relative motion thereafter. Each position adjustable control pedal 11 would be considered to be in a home position when each slideably engaged slider component 16 and reactor component 17 were in its home position. The relative position of each slideably engaged slider component 16 and reactor component 17 when they are in the home position is known. The position coordinates of each position adjustable control pedal 11 are also known when each slideably engaged slider component 16 and reactor component 17 are located at their home position and each position adjustable control pedal 11 is therefore located at its home position. Upon initiation of operation the computer program of the present invention causes the position control computer 88 to activate the positioning actuators 45 of the control pedal assembly 31 to drive each slideably engaged slider component 16 and reactor component 17 toward the home position. The computer program then causes the position control computer 88 to continue driving each slideably engaged slider component 16 and reactor component 17 toward the home position until each slideably engaged slider component and reactor component have reached their home position. The position control computer 88 would receive one or more signals when each slideably engaged slider component 16 and reactor component 17 reached their home position. The position control computer would interpret these signals to mean that each slideably engaged slider component 16 and reactor component 17 has reached the home position. Once a respective slideably engaged slider component 16 and reactor component 17 have reached their home position the computer program causes the position control computer 88 to discontinue activation of the respective positioning actuator 45 engaged to the slideably engaged slider component 16 and reactor component 17. Any of a number of systems linked to the position control computer 88 may provide the signals that the position control computer 88 interprets to mean that a slideably engaged slider component 16 and reactor component 17 have reached the home position. In the preferred embodiment the adjustment limiting system serves this purpose. In this embodiment, the computer program causes the position control computer 88 to drive each positioning actuator 45 in a predetermined direction which is the same direction for a given positioning actuator every time operation of the computer program is initiated. Each of the positioning actuators 45 is activated in this predetermined direction until each slideably engaged slider component 16 and reactor component 17 reach a relative position at an outer bound of their intended range of relative positions. Once each slideably engaged slider component 16 and reactor component 17 reach a relative position at the outer bound of their intended range of relative positions the adjustment limiting system disables further activation in that direction of the positioning actuator 45 that drives them. Once a positioning actuator 45 has been disabled from further driving of a slideably engaged slider component 16 and reactor component 17 toward the home position, the position control computer 88 surmises that that slideably engaged slider component 16 and reactor component 17 have reached their home position. Once the position control computer 88 has determined that all slideably engaged slider components 16 and reactor components 17 are in their home position the position control computer 88 surmises that all of the position control pedals 11 have reached their home position. As was mentioned above, the position coordinates of each position adjustable control pedal 11 when they are in their home position are known. The position control computer 88 can determine the position coordinates of each of the position control pedals 11 thereafter by adding the magnitudes and directions that each position adjustable control pedal 11 has been driven since it was in its home position to the position coordinates of the home position. For this to be possible, the control pedal assembly 31 must be constructed in a manner such that the position control computer 88 can track the magnitudes and directions in which the position of each of the position adjustable control pedals 11 are adjusted. In the preferred embodiment, the position control computer 88 would receive signals from the motivating devices 46 that the position control computer 88 could use to determine the direction and displacement that each motivating device 46 has been driven through. In the preferred embodiment, the rotary electric servomotors 56 are rotary electric stepper motors 89 that provide signals related to the direction of rotation and the number of revolutions and fractions thereof that the rotary electric stepper motor 89 is driven through, to the position control computer 88. In the preferred embodiment, the rotary electric stepper motor 89 drives a threaded shaft 57 with a constant thread pitch. Therefore, the position control computer 88 can calculate the direction and magnitude of displacement of a respective position adjustable control pedal 11 based upon the number and direction of revolutions that each rotary electric stepper motor 89 has been driven through and the thread pitch of the threaded shaft 57.

Figure 11C:
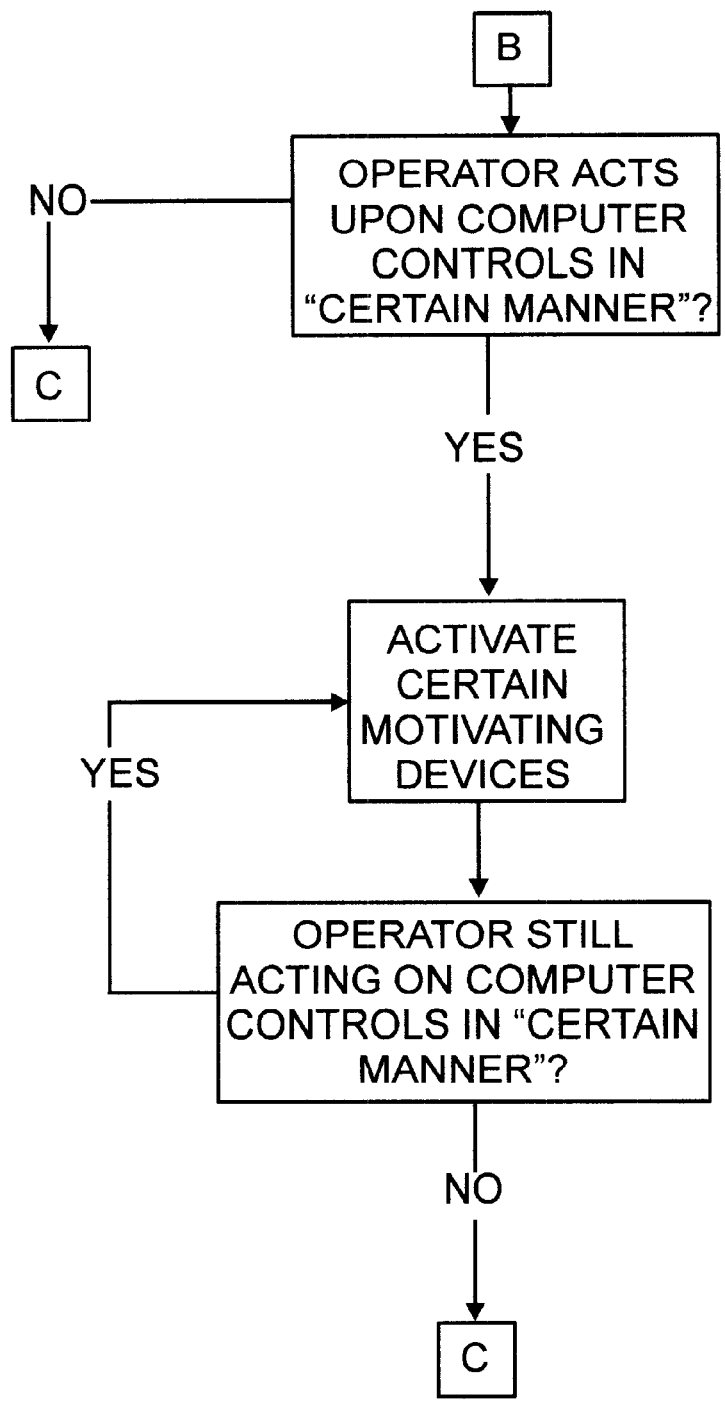
FIG. 11C is a portion of the flow chart of FIG. 11A that shows a portion of the algorithm of the computer program of the present invention that allows an operator to adjust positions of position adjustable vehicle components in a first manner.
Figure 11D:
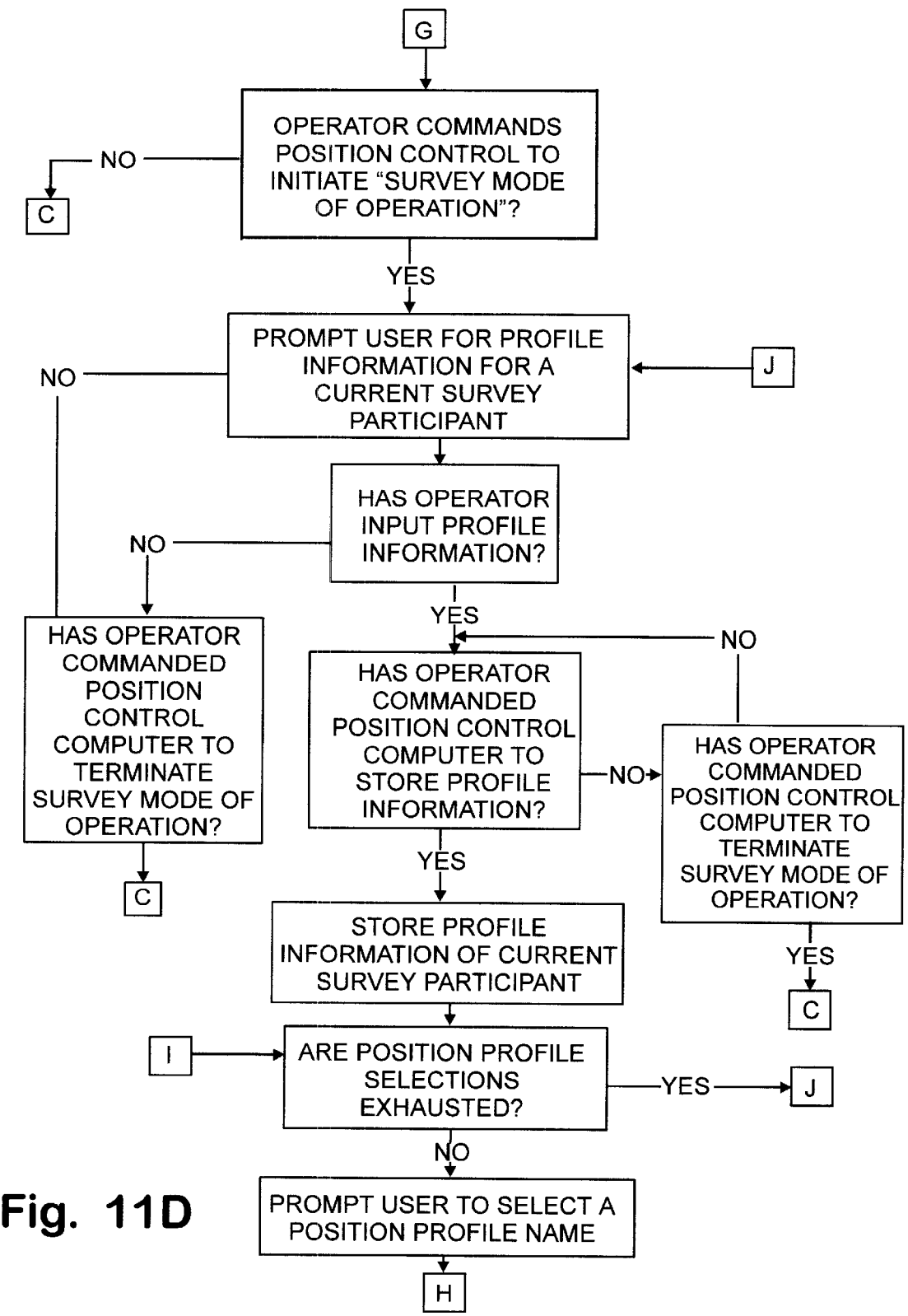
FIG. 11D is a portion of the flow chart of FIG. 11A that shows a beginning of a survey mode of operation portion of the algorithm of the computer program of the present invention.
Figure 11E:
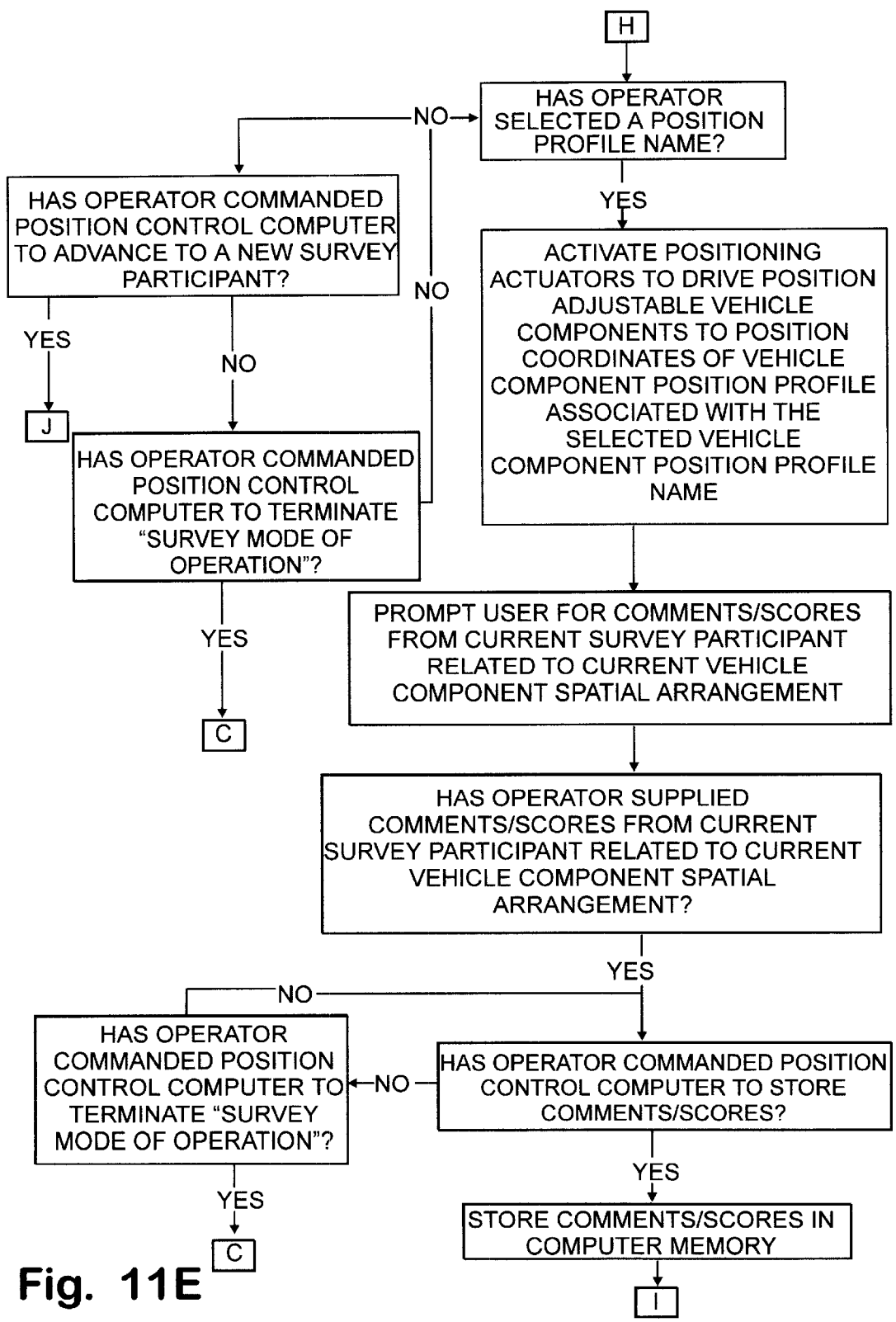
FIG. 11E is a portion of the flow chart of FIG. 11A that shows an end of a survey mode of operation portion of the algorithm of the computer program of the present invention.
Figure 11F:
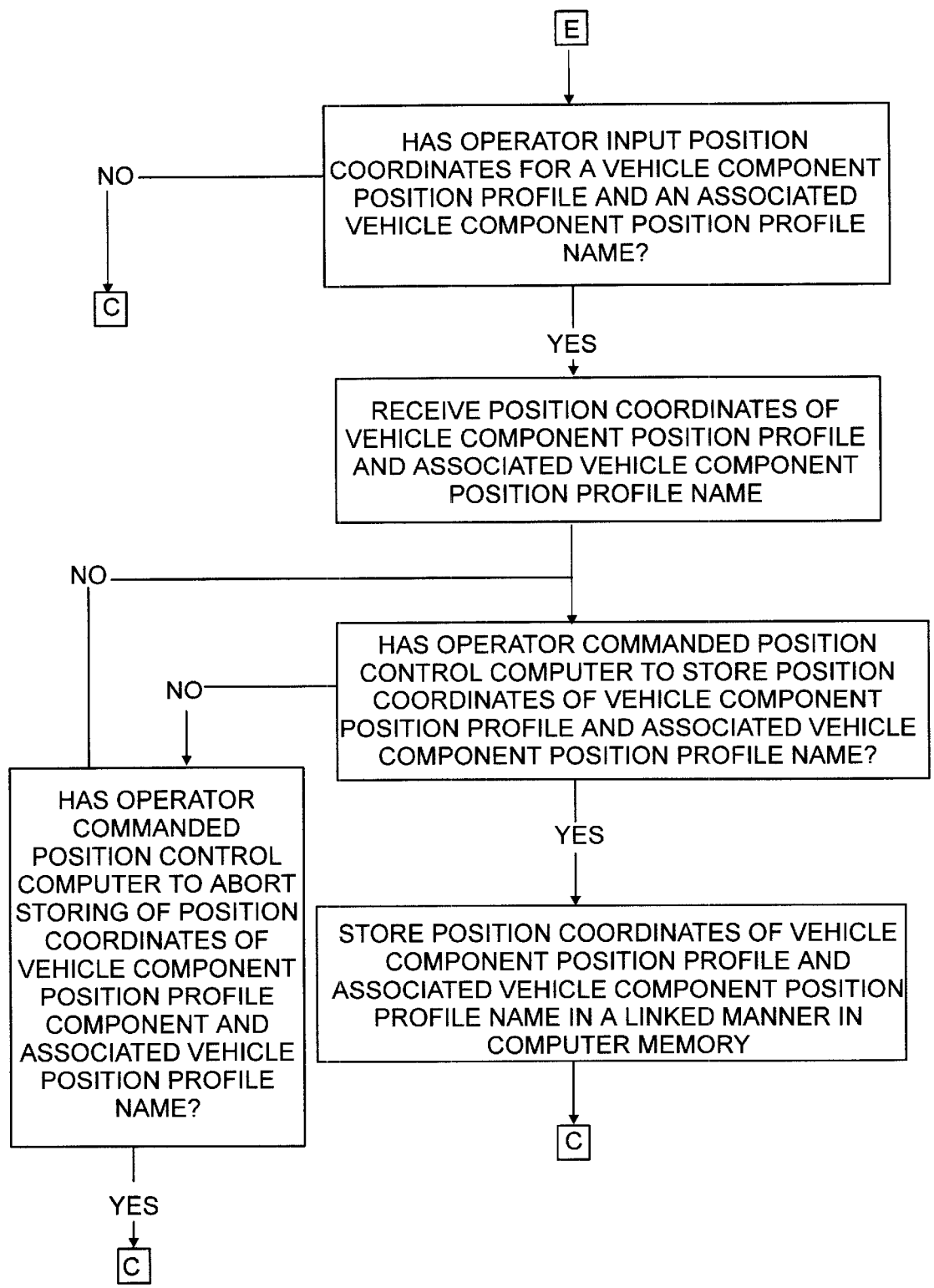
FIG. 11F is a portion of the flow chart of FIG. 11A that shows a portion of the algorithm of the computer program of the present invention that allows an operator to store vehicle component position profiles and associated vehicle component position profile names.
Figure 11G:
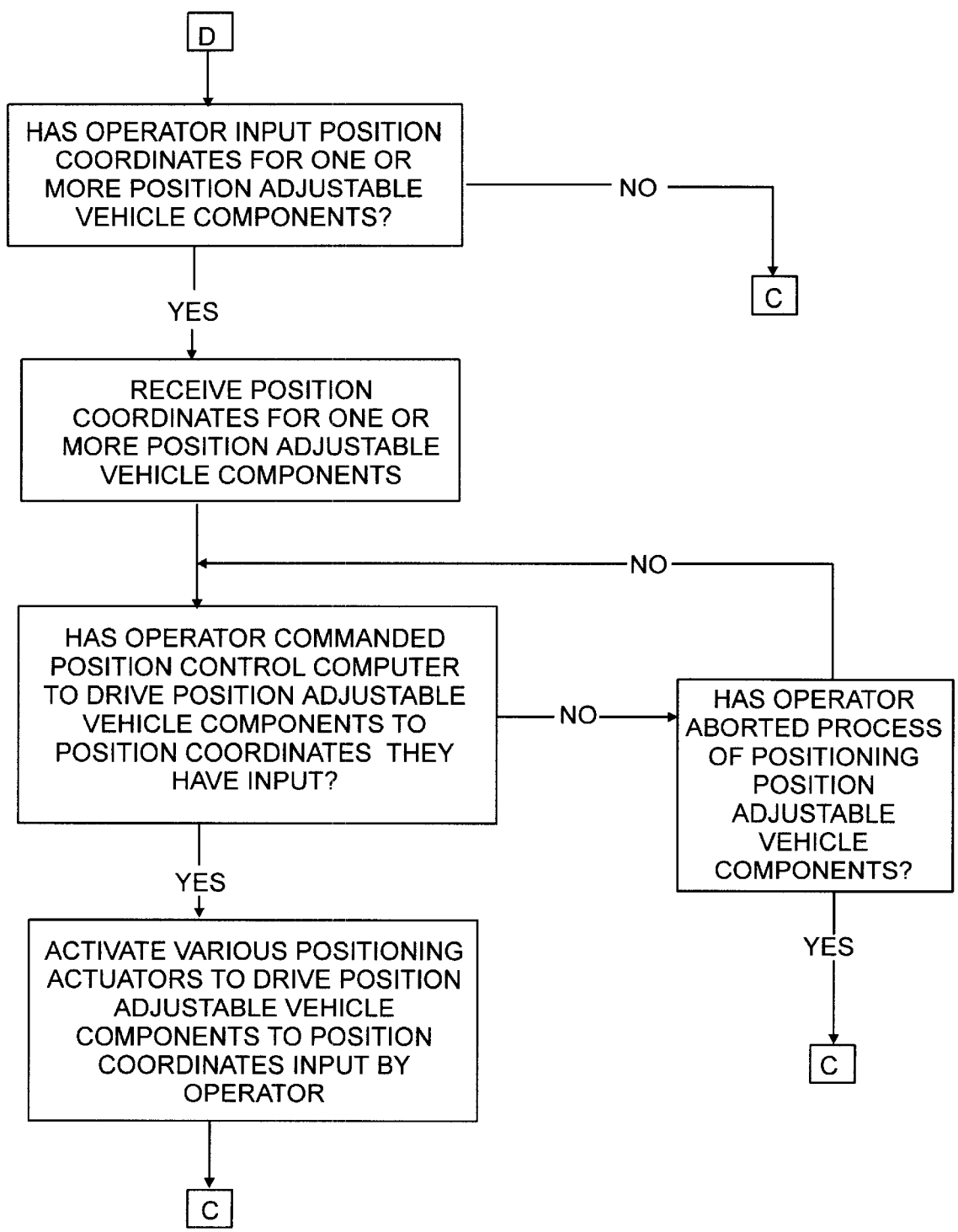
FIG. 11G is a portion of the flow chart of FIG. 11A that shows a portion of the algorithm of the computer program of the present invention that allows an operator to adjust positions of position adjustable vehicle components in a second manner.

As is best shown in FIGS. 11C and 11G The computer program of the present invention also causes the position control computer 88 to operate in a manner enabling a user of the position control computer 88 to adjust the position of each of the position adjustable control pedals 11. A user of the position control computer 88 operating according to the computer program of the present invention may selectively activate, indefinitely, various ones of the positioning actuators 45 in selected directions. The algorithm of the computer program is such that when a user acts in a certain manner upon certain control devices of the position control computer 88 the position control computer will activate certain positioning actuators 45 in certain directions indefinitely. In other words, the activated positioning actuators 45 will remain activated until the user stops acting upon the control devices of the position control computer 88 in the manner that caused the computer program to cause the position control computer 88 to indefinitely activate the positioning actuators 45. The computer program of the present invention may further enable a user to adjust the position of each position adjustable control pedal 11 to a predetermined set of position coordinates. The computer program would cause the position control computer 88 to operate in a manner such that a user may input a set of position coordinates for one or more position adjustable control pedals 11 that the user desires the position adjustable control pedals 11 to be positioned at. When a user commands the position control computer 88 to do so, the computer program causes the position control computer 88 to activate positioning actuators 45 in appropriate directions for an appropriate time to drive the position adjustable control pedals 11 to the specified position coordinates.

Figure 11H:
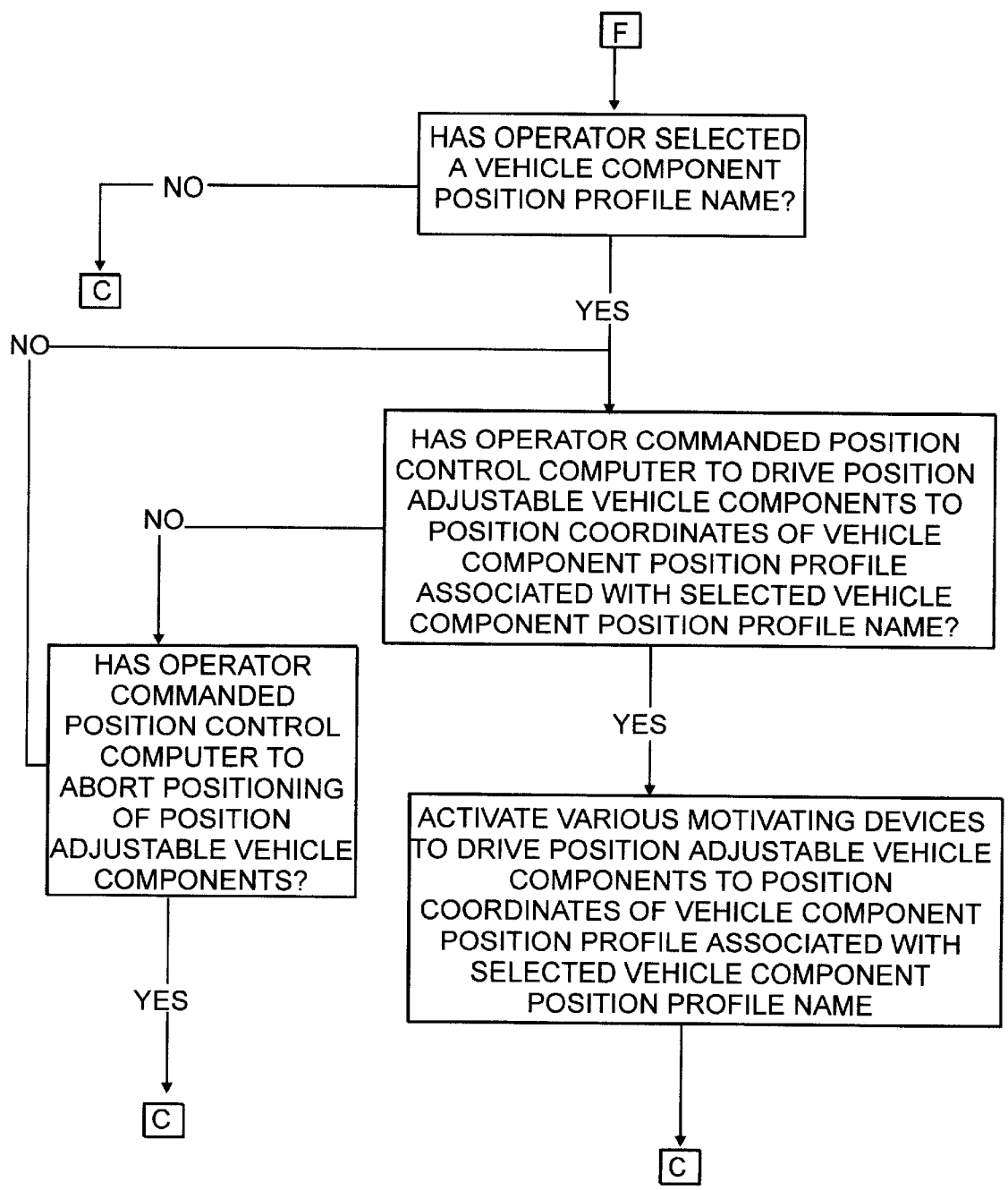
FIG. 11H is a portion of the flow chart of FIG. 11A that shows a portion of the algorithm of the computer program of the present invention that allows an operator to adjust positions of position adjustable vehicle components in a third manner.
Figure 11I:
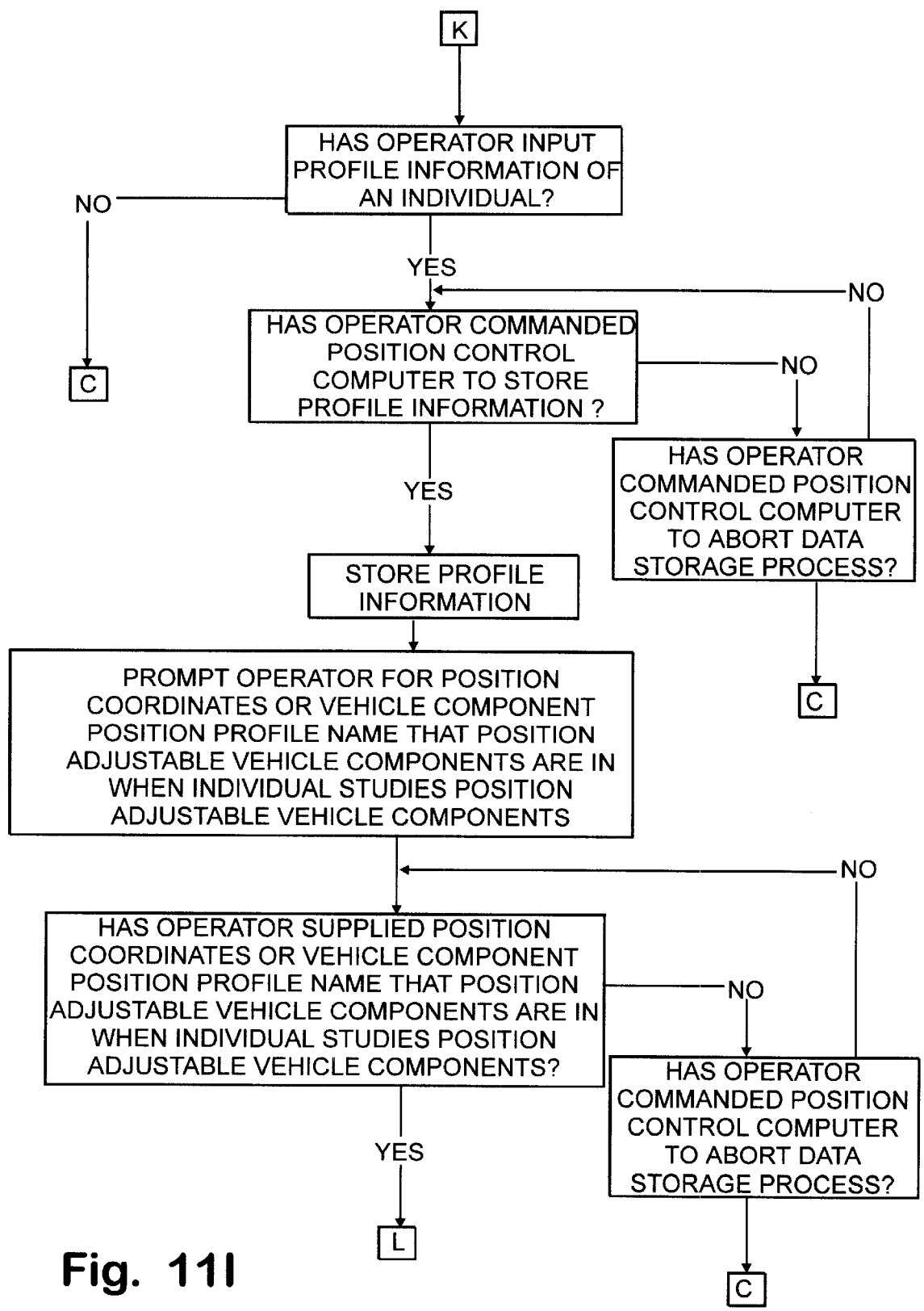
FIG. 11I is a portion of the flow chart of FIG. 11A that shows a beginning of a portion of the algorithm of the computer program of the present invention that allows an operator to store data.
Figure 11J:
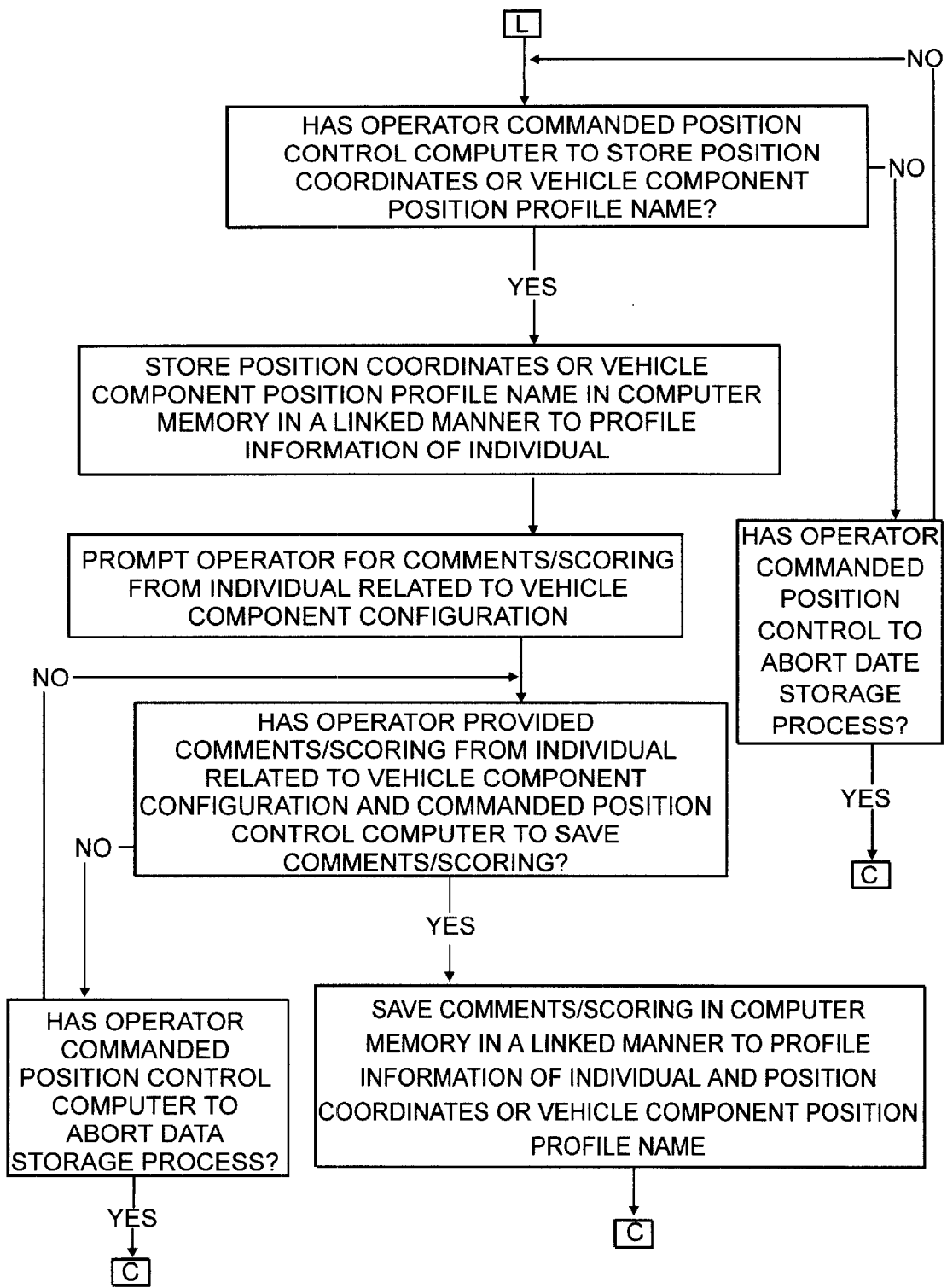
FIG. 11J is a portion of the flow chart of FIG. 11A that shows an end portion of the algorithm of the computer program of the present invention that allows an operator to store data.
Figure 12:
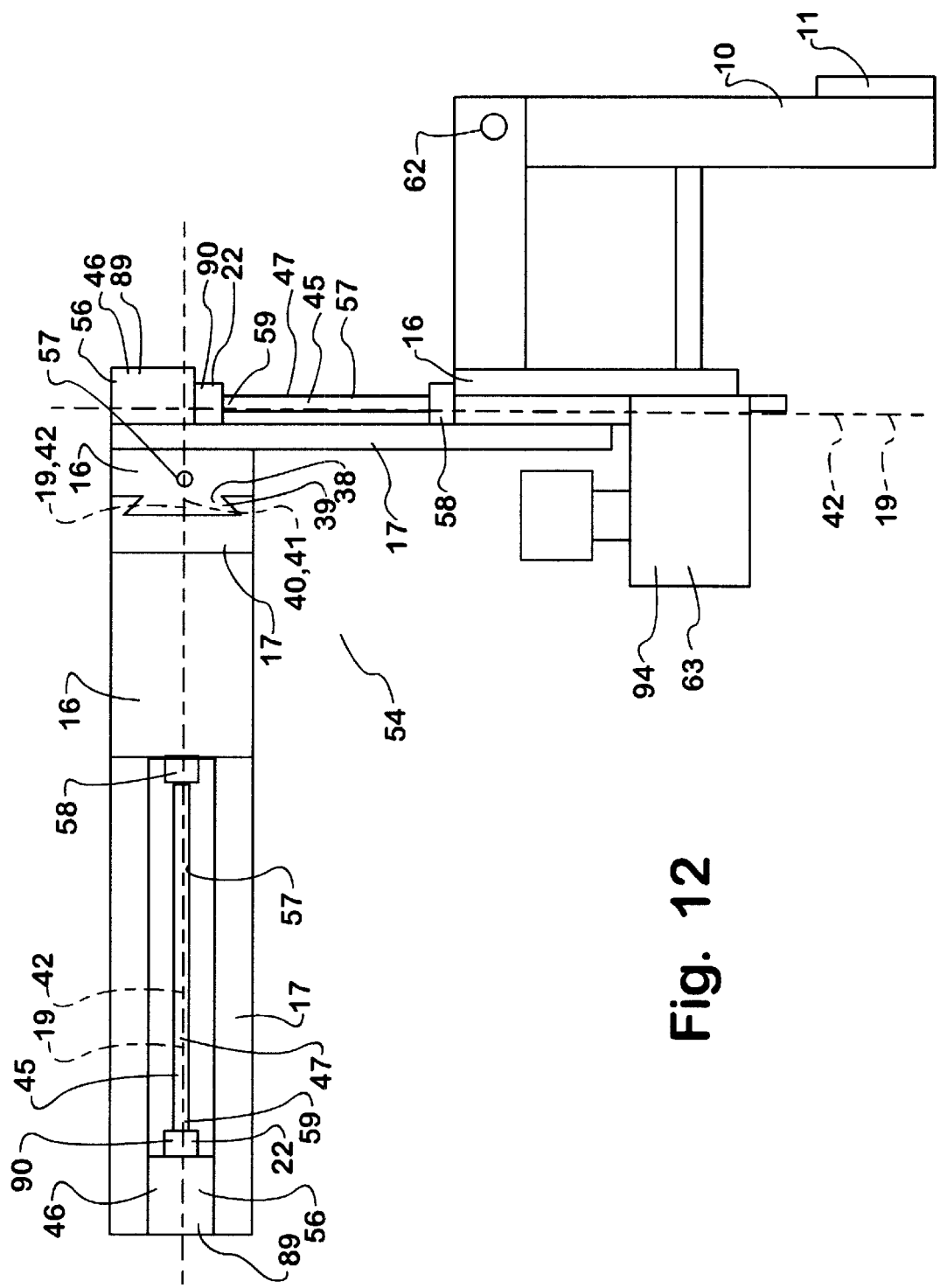
FIG. 12 is a side elevational view of a series of slider components and reactor components.
Figure 13:
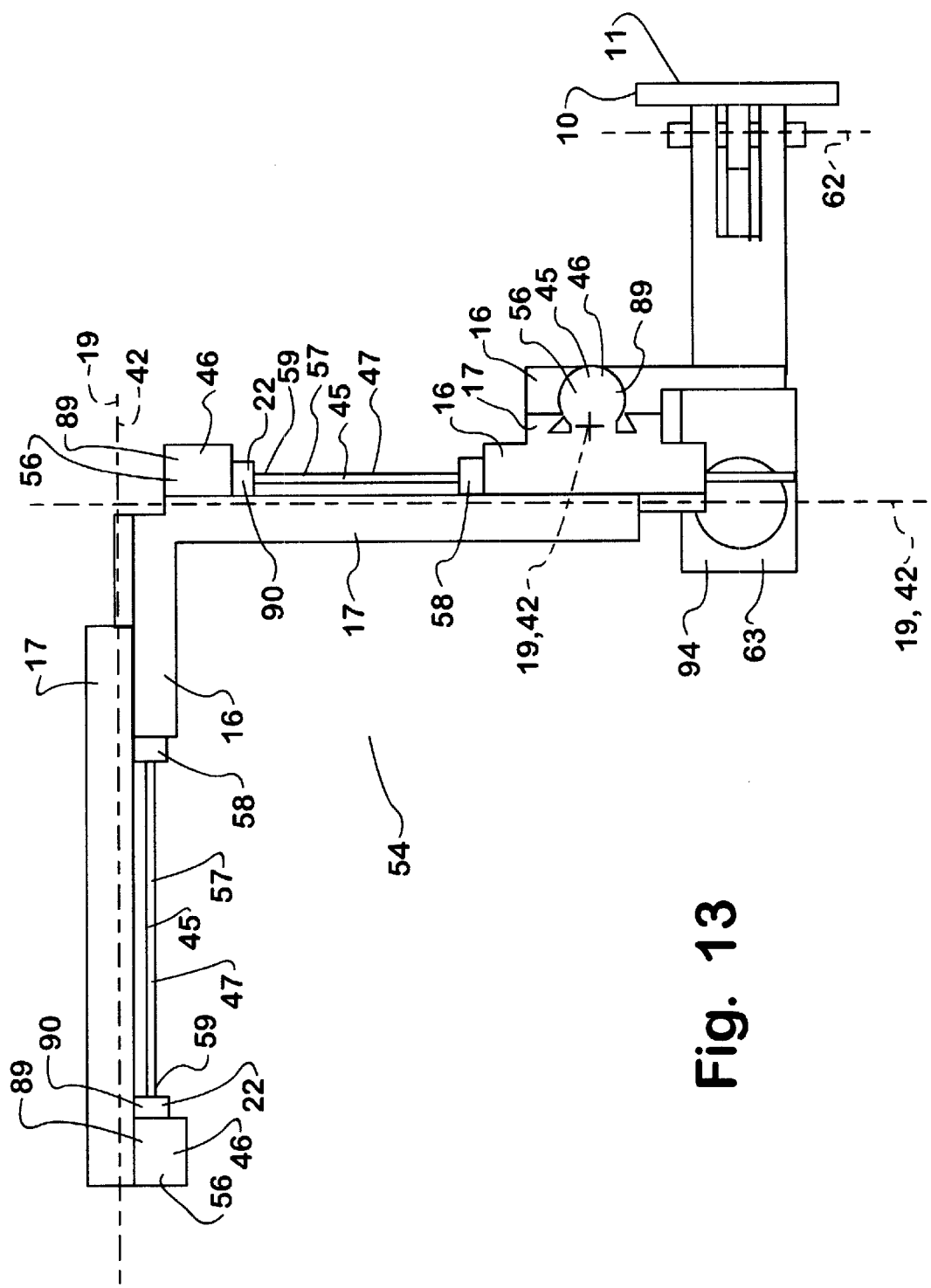
FIG. 13 is a plan view of a series of slider components and reactor components.

As is best shown in FIGS. 11I and 11J the computer program of the present invention may also cause the position control computer 88 to operate in a manner such that a user may store certain important types of data in computer memory. As was mentioned above, the control pedal assembly 31 of the present invention may be employed to perform ergonomic studies in which a number of individuals operate different spatial arrangements of position adjustable control pedals 11 and comment on the relative merit of specific control pedal configurations. When the control pedal assembly 31 is used to perform such ergonomic studies it is desirable to record profile information such as height, weight, other physical characteristics of individuals participating in the survey, and comments and scoring that each individual provides related to specific control pedal configurations. The computer program may cause the position control computer 88, upon being commanded to do so by a user, to store profile information such as a name, a height, and a weight of each of numerous survey participants in computer memory. The computer program may also cause the position control computer 88, upon being commanded to do so by a user, to store in computer memory evaluation information such as comments and scoring supplied by each survey participant related to the merit of specific control pedal configurations. The computer program may also cause the position control computer 88 to link the profile information of each study participant with the position coordinates of a specific control pedal configuration and the evaluation information provided by that study participant for that specific control pedal configuration. By linking the data in such a manner the computer program makes it possible for a user to later retrieve associated data. The computer program may be such that it causes the position control computer 88, when commanded to do so by a user, to search for and retrieve linked groups of profile, pedal configuration, and evaluation data, for which various of the data fields meet certain criteria specified by the user.

As is best shown in FIGS. 11F and 11H the computer program of the present invention may further cause the position control computer 88, when commanded to do so by a user, to store position coordinates of specific control pedal configurations in computer memory. The computer program would cause the position control computer 88 to receive from a user one or more control pedal position profiles and an equal number of control pedal position profile names. Each of the control pedal position profiles is a set of position coordinates for one or more of the position adjustable control pedals 11. Upon being commanded to do so by a user, the computer program would cause the position control computer 88 to store each control pedal position profile and an associated control pedal position profile name in computer memory in a linked manner. Because each control pedal position profile is linked to its control pedal position profile name in computer memory the control pedal position profile can easily be retrieved by the position control computer 88 when the position control computer 88 retrieves the control pedal position profile name. A user may subsequently select a control pedal position profile name and command the position control computer 88 to drive the position adjustable control pedals 11 to the position coordinates of an associated control pedal position profile. At this point the computer program would cause the position control computer 88 to activate various positioning actuators 45 until each of the position adjustable control pedals 11 is positioned at a point such that its position coordinates are those of the selected control pedal position profile. As an example of this functionality that is enabled by the computer program of the present invention, a user could store in computer memory three control pedal position profiles and their control pedal position profile names brand 1, brand 2, and brand 3. Each respective one of the control pedal position profiles of brand 1, brand 2, and brand 3, may have control pedal position coordinates that are the same as the position coordinates of the control pedal configurations of one of three actual vehicles 12. Once their control pedal position profiles are stored in computer memory, the position of the position adjustable control pedals 11 can be rapidly adjusted to the position coordinates of any one of the control pedal position profiles of brand 1, brand 2, or brand 3.

As is best shown in FIGS. 11D and 11F the computer program of the present invention may also be such that it enables a user to cause the position control computer 88 to operate in a survey mode of operation. A user might want to operate the position control computer 88 in the survey, mode of operation if the user wanted to have each of a number of individuals evaluate the relative merit of each of a number of control pedal position profiles. Once in the survey mode of operation the computer program would cause the position control computer 88 to prompt a user for the profile information of a current survey participant. The computer program would then cause the position control computer 88 to receive from the user profile information such as the name, height, weight, age, etc. of a current study participant and store that profile information in computer memory. The computer program would then cause the position control computer 88 to prompt the user to select a stored control pedal position profile name. After the user selects a control pedal position profile name the computer program would cause the position control computer 88 to drive the position adjustable control pedals 11 to the position coordinates of the control pedal position profile associated with the control pedal position profile name selected by the user. The computer program would then cause the position control computer 88 to prompt the user for responses from the current survey participant to questions about the relative merit of the current control pedal configuration. The user would then have the current study participant actuate the control pedals 11 of the current control pedal configuration and respond to the questions related to the relative merit of the current control pedal configuration. The user would then input the current study participant's answers to the questions about the relative merit of the current control pedal configuration and command the position control computer 88 to store the information. The computer program would then cause the position control computer 88 to store the study participant's answers in computer memory. The computer program would cause the position control computer 88 to link the profile information of the current survey participant, the position coordinates of the current control pedal configuration, and the comments and scoring of the current survey participant related to the relative merit of the current control pedal configuration in computer memory. By linking the data in such a manner the computer program makes it possible for a user to later retrieve associated data. The computer program causes the position control computer 88 to prompt the user for answers to questions related to the relative merit of a control pedal configuration until all such questions have been answered or the user commands the position control computer 88 to proceed to a new control pedal position profile. At that point the computer program causes the position control computer 88 to return to the step of prompting the user to select a stored control pedal position profile name and thereafter follows the subsequent steps as described above. The computer control program causes the position control computer 88 to perform the steps as described above until each control pedal position profile of a select set has been evaluated by a current survey participant or the user commands the position control computer to advance to a new survey participant. At that point the computer program causes the position control computer 88 to return to the step of prompting a user for profile information of a current survey participant and performing the subsequent steps as described above. The computer program causes the position control computer 88 to repeat the above steps described above until the user commands the position control computer 88 to terminate the survey mode of operation.

Unless it is specified in what order the computer program must cause the position control computer to perform certain steps, the computer program, in conjunction with a user, may cause the position control computer to perform many of the steps described above in parallel and/or simultaneously. It should also be noted that the position control computer 88 and the computer program described above could easily be used to control many other types of vehicle component assemblies that have position adjustable vehicle components of other types. These other types of vehicle component assemblies would be constructed in a similar manner to the control pedal assembly 31 described here except vehicle components other than control pedals 10 would be mounted to the vehicle component assembly.

The control pedal assembly 31 may be designed for use in an operational vehicle 12. In order for the position adjustable control pedals 11 of the control pedal assembly 31 to be useable to control the vehicle 12 they must be appropriately linked to those systems of the vehicle 12 which the position adjustable control pedals 11 are meant to control. Preferably, the control pedal assembly 31 is designed such that when the control pedal assembly 31 is properly mounted to an operational vehicle 12 each position adjustable control pedal 11 is functional in any of the positions to which an operator may adjust the position adjustable pedal 11. Any of a number of constructions of the control pedal assembly 31 would make it possible to maintain the functionality of each of the position adjustable control pedals 11 throughout the range of positions to which an operator may adjust each of the position adjustable control pedals 11. A pedal driven component 63 would be engaged to each slider component 16 to which a position adjustable control pedal 11 is directly engaged and also to the position adjustable control pedal 11. A pedal driven component 63 may be any of a number of devices. A pedal driven component 63 may be a control pedal position sensor 91 that is designed to be connected to a control system of the vehicle 12. Such a pedal position sensor 91 would be engaged to a position adjustable control pedal 11 and the slider component 16 to which the position adjustable control pedal 11 is mounted. The pedal position sensor 91, when connected to a vehicle control system, would provide signals to the vehicle control system related to the position of the position adjustable control pedal 11 relative to the respective slider component 16 to which the position adjustable control pedal 11 is mounted. Examples of such pedal position sensors 91 are the throttle pedal position sensors 92 that are known in the automotive industry. The pedal driven component 63 could, alternatively, be a fluid control valve 93 which is engaged to a position adjustable control pedal 11 and the respective slider component 16 to which the position adjustable control pedal 11 is mounted. The fluid control valve 93 would be engaged to the position adjustable control pedal 11 and the slider component 16 in a manner such that actuation of the position adjustable control pedal 11 would change the operational state of the fluid control valve 93. Thus, when the position adjustable control pedal 11 is actuated, the restriction to flow of fluid through various passages of the fluid control valve 93 would be changed. Examples of such fluid control valves 93 operatively connected to control pedals 10 are the fluid control valves 93 that are utilized as part of the control systems of air brake systems in heavy duty truck vehicles 12. The pedal driven component 63 could alternatively be a hydraulic master cylinder 94 that is engaged to a position adjustable control pedal 11 and the respective slider component 16 to which the position adjustable control pedal 11 is mounted. The hydraulic master cylinder 94 would be engaged to the position adjustable control pedal 11 and the respective slider component 16 in such a manner that when the position adjustable control pedal 11 were actuated hydraulic fluid would be forced under pressure from the hydraulic master cylinder 94. Examples of such hydraulic master cylinders 94 operatively connected to control pedals 10 include hydraulic master cylinders 94 employed to actuate hydraulic vehicle braking systems and hydraulic master cylinders 94 employed in hydraulic clutch control systems of vehicles 12. All of the types of pedal driven components 63 listed above can be linked to the vehicle systems that they are designed to influence in a flexible manner. The pedal position sensor 91 can be linked to control systems of the vehicle 12 by flexible electricity conducting wires. Fluid control valves 93 and hydraulic master cylinders 94 can be linked to other vehicle systems by flexible fluid transmitting tubing. Thus, if an operator adjusts an initial position of a position adjustable control pedal 11 to which a pedal driven component 63 is engaged the functionality of the position adjustable control pedal 11 and the pedal driven component 63 are not disabled.

The control pedal assembly 31 may, alternatively, be designed to be included as part of a vehicle model 13. In such a situation, it is not necessary that the position adjustable control pedals 11 be controllably linked to operating systems. It may, however, be desirable to construct the control pedal assembly 31 in a manner such that actuation of the position adjustable control pedals 11 feels similar to actuation of operational control pedals 10 of a vehicle 12. In such a case, the control pedal assembly 31 may include one or more pedal driven components 63 that are pedal resistance components. Such pedal resistance components would be constructed of one or more springs and possibly one or more dampers engaged to a position adjustable control pedal 11 and the slider component 16 to which that position adjustable control pedal 11 is mounted. Such a pedal resistance component would be constructed and engaged to the position adjustable control pedal 11 and the slider component 16 in such a manner that the pedal resistance component resists operational motions of the position adjustable control pedal 11 away from its initial position. Each pedal resistance component is preferably constructed with a spring rate and damping rate tailored to the application for which the pedal resistance component is intended. For example, a pedal resistance component may be intended to be engaged to a position adjustable pedal 11 that simulates a brake pedal of a vehicle 12. In such a case the spring rate and damping rate of the pedal resistance component would be designed such that actuation of the position adjustable pedal 11 would feel similar to actuation of a position adjustable pedal 11 which is actually linked to a brake system of a vehicle 12.

As mentioned above, the control pedal assembly 31 of the present invention may be included in a vehicle model 13. The vehicle model 13 would likely be comprised of a model base component 76 to which the pedal mounting system base component 15 would be mounted. The vehicle model 13 would also likely be comprised of a seat 77 engaged to the model base component 76 on the same side of the pedal mounting system base component 15 that the position adjustable control pedals 11 are disposed. An individual 78 could, thus, sit in the seat, contact and actuate the position adjustable control pedals 11 with their feet 79, and evaluate the merit of various spatial arrangements of the position adjustable control pedals 11.

The control pedal assembly 31 may, alternatively, be included as a portion of a vehicle 12 as was mentioned above. Such a vehicle 12 would include a frame 80. A suspension 86, for supporting the vehicle 12, would be engaged to the frame 80. A drivetrain 85, for motivating the vehicle 12, would be engaged to the frame 80 and the suspension 86. The drivetrain 85 may be comprised of an engine 84. An operator cabin 81, from which an individual would operate the vehicle 12, would be engaged to the frame 80. The operator cabin 81 would be comprised of a dash panel 82 at a forward side 83 of the operator cabin 81. The pedal mounting system base component 15 would be engaged directly or indirectly to the dash panel 82 or may, alternatively, be one and the same component as the dash panel 82. The pedal mounting system base component 15 may be engaged indirectly to the dash panel 82, as mentioned above, by being engaged to any of a number of other components of the operator cabin 81 that are, in turn engaged to the dash panel 82. Such other components that pedal mounting system base component 15 could be engaged to that are in turn engaged to the dash panel 82 would included but not be limited to a floor 98 of the operator cabin 81 and miscellaneous side components of the operator cabin 81. The vehicle 12 would also likely be comprised of a braking system that would likely be of either a hydraulically actuated design or an air actuated design, both of which are well known. One of the position adjustable control pedals 11 may be a brake pedal 95 that is controllably linked to the braking system of the vehicle 12 so that an operator of the vehicle 12 could effect the operational state of the braking system by actuating the brake pedal 95. A pedal driven component 63 engaged to the brake pedal 95 and a slider component 16 to which the brake pedal 11 is mounted may be a hydraulic master cylinder or a fluid control valve. The hydraulic master cylinder or fluid control valve may be linked to the braking system of the vehicle 12 by flexible tubing through which hydraulic brake fluid or compressed air may flow between the hydraulic master cylinder or the fluid control valve and the brake system of the vehicle 12. The vehicle 12 may also have a drivetrain clutch for selectively engaging or disengaging portions of the drivetrain 85 that are in series. One of the position adjustable control pedals 11 may be a clutch pedal 96 that is controllably linked to the drivetrain clutch so that an operator of the vehicle 12 could control engagement of the drivetrain clutch by actuating the clutch pedal 96. A pedal driven component 63 engaged to the clutch pedal 96 and a slider component 16 to which the clutch pedal 96 is mounted may be a hydraulic master cylinder or a fluid control valve. The hydraulic master cylinder or fluid control valve may be linked to a drivetrain clutch control system of the vehicle 12 by flexible tubing through which hydraulic fluid or compressed air may flow between the hydraulic master cylinder or fluid control valve and the clutch control system. One of the position adjustable control pedals 11 may also be a throttle pedal 97. The throttle pedal 97 would be controllably linked to the engine 84 of the drivetrain 85 of the vehicle 12 in a manner such that an operator of the vehicle 12 could control the throttling of the engine 84 by actuating, the throttle pedal 97. A pedal driven component 63 engaged to the throttle pedal 97 and a slider component 16 to which the throttle pedal 97 is mounted may be a throttle pedal position sensor 92. The throttle pedal position sensor 92 would be linked to an electronic engine control system of the vehicle 12 by flexible electricity conducting wires. The flexible connection of the pedal driven components 63 to the systems of the vehicle 12 provides for position adjustable control pedals 11 which are functional to control the vehicle 12 regardless of the adjustment of the initial position of the position adjustable control pedals 11.

Those skilled in the art will appreciate that modifications could be made to the invention as described without departing from the spirit and scope of the invention and thus the scope of the invention is limited only by the following claims.

I claim:

1. A control pedal assembly comprising:
   (a) a pedal mounting system base component;
   (b) a first series of slider components and reactor components mounted to said pedal mounting system base component;
   (c) a first position adjustable control pedal mounted to said first series of slider components and reactor components;
   (d) wherein said first series of slider components and reactor components is comprised of a first slider component, a first reactor component, a second slider component, and a second reactor component;
   (e) wherein said first slider component and said first reactor component are constructed and slideably engaged to one another in a manner such that relative translation between said first slider component and said first reactor component is only allowed along a first adjustment curve;
   (f) wherein said first reactor component is either fixedly engaged to or is a same component as said second slider component;
   (g) wherein said second slider component and said second reactor component are constructed and slideably engaged to one another in a manner such that relative translation between said second slider component and said second reactor component is only allowed along a second adjustment curve;
   (h) wherein said first position adjustable control pedal is engaged to said first slider component in a manner preventing any substantial relative motion between said first slider component and said first position adjustable control pedal other than operational motions of said first position adjustable control pedal;
   (i) wherein said second reactor component is engaged to said pedal mounting system base component;
   (j) wherein said first slider component, said first reactor component, said second slider component, and said second reactor component are constructed and engaged to one another in an orientation such that said first adjustment curve extends in different directions than said second adjustment curve so that an initial position of said first position adjustable control pedal relative to said pedal mounting system base component is adjustable in at least two directions;
   (k) a second series of slider components and reactor components which is mounted to said pedal mounting system base component;
   (l) a second position adjustable control pedal mounted to said second series of slider components and reactor components;
   (m) wherein said second series of slider components and reactor components is comprised of a third slider component and a third reactor component;
   (n) wherein said third slider component and said third reactor component are constructed and slideably engaged to one another in a manner such that relative translation between said third slider component and said third reactor component is only allowed along a third adjustment curve;
   (o) wherein said second position adjustable control pedal is engaged to said third slider component in a manner preventing any substantial relative motion between said third slider component and said second position adjustable control pedal other than operational motions of said second position adjustable control pedal;
   (p) wherein said third reactor component is engaged directly or indirectly to said pedal mounting system base component; and
   (q) wherein said first slider component is moveable along said first adjustment curve completely independently of said third slider component which is moveable along said third adjustment curve completely independently of said first slider component such that said initial position of said first position adjustable control pedal is adjustable relative to and independent of an initial position of said second position adjustable control pedal in at least one direction.

2. The control pedal assembly of claim 1, wherein:
   (a) said second series of slider components and reactor components is further comprised of a fourth slider component, and a fourth reactor component;
   (b) said third reactor component is either fixedly engaged to or is a same component as said fourth slider component;
   (c) said fourth slider component and said fourth reactor component are constructed and slideably engaged to one another in a manner such that relative translation between said fourth slider component and said fourth reactor component is only allowed along a fourth adjustment curve;
   (d) said fourth reactor component is engaged to said pedal mounting system base component; and
   (e) said third slider component, said third reactor component, said fourth slider component, and said fourth reactor component are constructed and engaged to one another in an orientation such that said third adjustment curve extends in different directions than said fourth adjustment curve so that said initial position of said second position adjustable control pedal relative to said pedal mounting system base component is adjustable in at least two directions.

3. The control pedal assembly of claim 2, further comprising:
   (a) a plurality of positioning actuators each of which is engaged to a respective slider component and a respective reactor component of a pair of a slider component and a reactor component that are slideably engaged;
   (b) wherein each of said positioning actuators is comprised of a motivating device and connecting linkages;
   (c) wherein when said motivating device of each positioning actuator is activated, said motivating device applies a sliding force to said respective slider component in a direction substantially parallel to a respective adjustment curve of said pair of a slider component and a reactor component that are slideably engaged;
   (d) wherein when said motivating device of each positioning actuator is activated, said positioning actuator applies a reaction force to said respective reactor component, of said pair of a slider component and a reactor component that are slideably engaged, in a direction substantially opposite to said sliding force;
   (e) one or more position control apparatus to one of which each of said positioning actuators is linked; and
   (f) wherein each of said one or more position control apparatus are constructed and linked to said positioning actuators in a manner such that a user of said control pedal assembly can operate said one or more position control apparatus to selectively activate various ones of said positioning actuators, slideably translate various slideably engaged slider components and reactor components, and alter a position of one or more of said position adjustable control pedals.

4. The control pedal assembly of claim 3, wherein:
(a) one or more slide members are engaged to said slider component.
(b) said reactor component, of each pair of a slider component and a reactor component that are slideably engaged, defines for each slide member that is engaged to said slider component a complimentary slide recess within which each slide member that is engaged to said slider component is disposed;
(c) a respective one of the adjustment curves is defined parallel to one or more slide recess central axes of each pair of a slider component and a reactor component that are slideably engaged.

5. The control pedal assembly of claim 4, wherein:
(a) said first series of slider components and reactor components is further comprised of a fifth slider component and a fifth reactor component;
(b) said second reactor component is either fixedly engaged to or is a same component as said fifth slider component;
(c) said fifth slider component and said fifth reactor component are constructed and slideably engaged to one another in a manner such that relative translation between said fifth slider component and said fifth reactor component is only allowed along a fifth adjustment curve;
(d) said fifth reactor component is fixedly engaged to said pedal mounting system base component, or is one and a same component as said pedal mounting system base component;
(e) said first slider component, said first reactor component, said second slider component, said second reactor component, said fifth slider component, and said fifth reactor component are constructed and engaged to one another in an orientation such that said fifth adjustment curve extends in different directions than either of said first adjustment curve and said second adjustment curve so that said initial position of said first position adjustable control pedal relative to said pedal mounting system base component is adjustable in at least three directions;
(f) said second series of slider components and reactor components is further comprised of a sixth slider component and a sixth reactor component;
(g) said fourth reactor component is either fixedly engaged to or is a same component as said sixth slider component;
(h) said sixth slider component and said sixth reactor component are constructed and slideably engaged to one another in a manner such that relative translation between said sixth slider component and said sixth reactor component is only allowed along a sixth adjustment curve;
(i) said sixth reactor component is fixedly engaged to said pedal mounting system base component, and
(j) said third slider component, said third reactor component, said fourth slider component, said fourth reactor component, said sixth slider component, and said sixth reactor component are constructed and engaged to one another in an orientation such that said sixth adjustment curve extends in different directions than either of said third adjustment curve or said fourth adjustment curve so that said initial position of said second position adjustable control pedal relative to said pedal mounting system base component is adjustable in at least three directions.

6. The control pedal assembly of claim 5, wherein:
(a) said motivating device of each respective positioning actuator is comprised of a rotary electric servomotor;
(b) said connecting linkages of each respective positioning actuator are comprised of a threaded shaft and a driven nut;
(c) said rotary electric servomotor is operably connecting a slider component and a reactor component of a respective pair of a slider component and a reactor component that are slideably engaged;
(d) said threaded shaft is engaged to an output shaft of said rotary electric servomotor;
(e) said threaded shaft is threadingly engaged to a threaded bore of said driven nut;
(f) said rotary electric servomotor is linked to one or more of said position control apparatus which are constructed in a manner such that an operator can utilize said position control apparatus to activate said rotary electric servomotor and selectively cause clockwise or counterclockwise rotation of said output shaft of said rotary electric servomotor; and
(g) when said rotary electric servomotor is activated and said output shaft of said respective rotary electric servomotor rotates said threaded shaft is driven rotationally, said respective driven nut is driven along said respective threaded shaft, said sliding force and said reaction force are applied to said slider component and said reactor component respectively, and said slideably engaged slider component and reactor component translate relative to one another along a respective adjustment curve.

7. The control pedal assembly of claim 6, further comprising:
(a) a first pedal driven component engaged to said first position adjustable control pedal and said first slider component; and
(b) a second pedal driven component engaged to said second position adjustable control pedal and said third slider component.

8. The control pedal assembly of claim 7, wherein:
(a) each of said first slider component, said second slider component, said third slider component, said fourth slider component, said fifth slider component, and said sixth slider component are engaged to other slider components of said control pedal assembly only through intermediate engagement to reactor components of said control pedal assembly; and
(b) said initial position of said first position adjustable pedal is adjustable relative to and independent of said initial position of said second position adjustable control pedal in at least three directions.

9. The control pedal assembly of claim 8, wherein:
(a) said first pedal driven component is a pedal position sensor which is designed to be linked to the electronic engine controller of the vehicle and relay signals to the electronic engine controller related to a position of said first position adjustable control pedal relative to said first slider component;

(b) wherein said first pedal driven component is designed to be flexibly linked to the electronic engine controller of the vehicle such that when said control pedal assembly is mounted to the vehicle said first position adjustable control pedal and said pedal position sensor remain functional regardless of where an operator adjusts said initial position of said first position adjustable control pedal;

(c) said second pedal driven component is either a hydraulic master cylinder or a fluid control valve that is designed to be linked to the braking system of the vehicle; and (d) wherein said second pedal driven component is designed to be flexibly linked to the braking system of the vehicle such that when said control pedal assembly is mounted to the vehicle said second position adjustable control pedal and said second pedal driven component remain functional regardless of where an operator adjusts said initial position of said second position adjustable control pedal.

10. The control pedal assembly of claim 9, wherein:

(a) each pair of a slider component and a reactor component that are slideably engaged is comprised of only one slide member that is fixedly engaged to said slider component;

(b) each reactor component, of said each pair of a slider component and a reactor component that are slideably engaged, defines an only slide recess of each slideably engaged slider component and reactor component;

(c) said slide recess central axes of each slide recess is a straight line and thus a respective adjustment curve of each pair of a slider component and a reactor component that are slideably engaged is a straight line;

(d) said slider components and said reactor components of said first series of slider components and reactor components are constructed and engaged to one another in an orientation such that said slide recess central axes of each slideably engaged slider component and reactor component of said first series of slider components and reactor components are disposed substantially perpendicular to slide recess central axes of all other slideably engaged slider components and reactor components of said first series of slider components and reactor components;

(e) said slider components and said reactor components of said second series of slider components and reactor components are constructed and engaged to one another in an orientation such that said slide recess central axes of each slideably engaged slider component and reactor component of said second series of slider components and reactor components are disposed substantially perpendicular to slide recess central axes of all other slideably engaged slider components and reactor components of said second series of slider components and reactor components;

(f) each rotary electric servomotor of each positioning actuator of said control pedal assembly is fixedly engaged to an end portion of a reactor component with said output shaft of each rotary electric servo motor disposed substantially parallel to slide recess central axes of slide recesses defined by said reactor component to which each rotary electric servomotor is fixedly engaged; and (g) each driven nut is fixedly engaged to a slider component with a bore axis of each threaded bore of each driven nut disposed substantially parallel to slide member central axes of slide members that are engaged to said slider component to which said each driven nut is fixedly engaged to.

11. The control pedal assembly of claim 10, further comprising:

(a) a third series of slider components and reactor components mounted to said pedal mounting system base component;

(b) a third position adjustable control pedal mounted to said third series of slider components and reactor components;

(c) wherein said third series of slider components and reactor components is comprised of a seventh slider component, a seventh reactor component, an eighth slider component, an eighth reactor component, a ninth slider component, and a ninth reactor component;

(d) wherein said seventh slider component and said seventh reactor component are constructed and slideably engaged to one another in a manner such that relative translation between said seventh slider component and said seventh reactor component is only allowed along a seventh adjustment curve;

(e) wherein said seventh reactor component is either fixedly engaged to or is a same component as said eighth slider component;

(f) wherein said eighth slider component and said eighth reactor component are constructed and slideably engaged to one another in a manner such that relative translation between said eighth slider component and said eighth reactor component is only allowed along an eighth adjustment curve;

(g) wherein said eighth reactor component is either fixedly engaged to or is a same component as said ninth slider component;

(h) wherein said ninth slider component and said ninth reactor component are constructed and slideably engaged to one another in a manner such that relative translation between said ninth slider component and said ninth reactor component is only allowed along a ninth adjustment curve;

(i) wherein said third position adjustable control pedal is engaged to said seventh slider component in a manner preventing any substantial relative motion between said seventh slider component and said third position adjustable control pedal other than operational motions of said third position adjustable control pedal;

(j) wherein said ninth reactor component is fixedly engaged to said pedal mounting system base component; and (k) wherein said seventh slider component, said seventh reactor component, said eighth slider component, said eighth reactor component, said ninth slider component, and said ninth reactor component are constructed and engaged to one another in an orientation such that said seventh adjustment curve, said eighth adjustment curve, and said ninth adjustment curve each extend in different directions relative to one another so that an initial position of said third position adjustable control pedal relative to said pedal mounting system base component is adjustable in at least three directions.

12. The control pedal assembly of claim 11, further comprising:

(a) a model base component to which said pedal mounting system base component is mounted;

(b) a seat which is mounted to said model base component; and (c) wherein said seat is disposed on a same side of said pedal mounting system base component as are said first position adjustable control pedal and said second position adjustable control pedal.

13. The control pedal assembly of claim 3, further comprising:
(a) a model base component to which said pedal mounting system base component is mounted;
(b) a seat which is mounted to said model base component; and
(c) wherein said seat is disposed on a same side of said pedal mounting system base component as are said first position adjustable control pedal and said second position adjustable control pedal.

14. The control pedal assembly of claim 3, wherein:
(a) said one or more position control apparatus are comprised of a position control computer that is controllably linked to one or more of said one or more positioning actuators;
(b) said position control computer operates according to an algorithm encoded in a computer program which is embodied in a computer readable medium;
(c) said computer program causes said position control computer to perform the steps of:
  i) determining position coordinates of each of said position adjustable control pedals;
  ii) displaying said position coordinates of each of said position adjustable control pedals so that a user of said position control computer may be aware of said position coordinates of each of said position adjustable control pedals;
  iii) upon a user acting upon computer control devices of said position control computer in a certain manner, activating one or more of said motivating devices of said positioning actuators to slideably drive a respective one or more of said slider components relative to a respective said one or more reactor components that they are slideably engaged to until said user stops acting upon said computer control devices in said certain manner; and
  iv) receiving input from said user related to position coordinates that said user would like each position adjustable control pedal to be located at and subsequently activating various of said motivating devices of said control pedal assembly until position coordinates of each position adjustable control pedal are equal to said position coordinates input by said user.

15. The control pedal assembly of claim 14, wherein:
(a) said computer program product embodied in computer readable medium causes said position control computer to further perform the steps of:
  i) receiving from a user of said position control computer one or more control pedal position profiles and an equal number of associated control pedal position profile names;
  ii) storing each of said control pedal position profiles and each associated control pedal position profile name received from said user of said position control computer in computer memory in a linked manner; and
  iii) upon a user of said position control computer selecting a control pedal position profile name and commanding said position control computer to drive said position adjustable control pedals to position coordinates of an associated control pedal position profile, activating various of said motivating devices until each position adjustable control pedal is located in a position such that its position coordinates are equal to those of said control pedal position profile that is associated with said control pedal position profile name selected by said user.

16. The control pedal assembly of claim 15, wherein:
(a) upon initiation of a survey mode of operation of said computer program by a user and before termination of said survey mode of operation of said computer program by said user, said computer program product embodied in computer readable medium causes said position control computer to perform the steps of:
  i) prompting said user for profile information of a current survey participant;
  ii) upon entry of profile information of said current survey participant, and subsequently being commanded by said user to store said profile information, storing said profile information of said current survey participant in computer memory;
  iii) prompting a user to select one of a plurality of said control pedal position profile names;
  iv) after said user selects a control pedal position profile name, activating various of said motivating devices until said position adjustable control pedals have position coordinates equal to a control pedal position profile associated with said control pedal position profile name that was selected by said user;
  v) prompting said user for comments and/or scoring from said current survey participant related to said control pedal position profile associated with said control pedal position profile name that said user has selected;
  vi) upon entry of said comments and/or scoring from said current survey participant and subsequently being commanded by said user to store said comments and/or scoring, storing in memory said comments and/or scoring from said current survey participant related to said control pedal position profile associated with the control pedal position profile name that was selected by said user of the position control computer;
  vii) repeating steps iii through vi until each of a select set of control pedal position profiles that are stored in computer memory have been studied by said current survey participant or until said user of said position control computer commands said position control computer to advance to a next survey participant; and
  viii) repeating steps i through vii until said user of said position control computer chooses to terminate operation of said survey mode of operation of said computer program.

17. The control pedal assembly of claim 16, wherein:
(a) said control pedal assembly is further comprised of one or more adjustment limiting systems;
(b) said one or more adjustment limiting systems are each comprised of one or more limit switches engaged to one or more of said reactor components and/or one or more of said slider components of said control pedal assembly;
(c) said limit switches are electrically linked either directly or indirectly to one or more of said positioning actuators and/or one or more of said position control apparatus;
(d) each of said one or more adjustment limiting systems are constructed and engaged to said control pedal assembly in a manner such that when each respective slideably engaged slider component and reactor component are positioned relative to one another within a respective intended range of relative positions, activation of a respective positioning actuator that is engaged to each respective slideably engaged slider component and reactor component is enabled in either direction;

(e) each of said one or more adjustment limiting systems are constructed and engaged to said control pedal assembly in a manner such that when a respective slideably engaged slider component and reactor component are slideably driven by a respective positioning actuator to a relative position that is at an outer bound of said respective intended range of relative positions a respective adjustment limiting system disables activation of said respective positioning actuator in said direction that said respective positioning actuator slideably drove said respective slideably engaged slider component and reactor component to a relative position at an outer bound of said respective intended range of relative positions, thus, said adjustment limiting system disables said respective positioning actuator from slideably driving said respective slideably engaged slider component and reactor component from a relative position at an outer bound of said respective intended range of relative positions to a relative position outside said respective intended range of relative positions;

(f) each rotary electric servomotor of said one or more motivating devices is a rotary electric stepper motor;

(g) each rotary electric stepper motor is constructed and electrically linked to said position control computer in a manner such that each rotary electric stepper motor transmits signals related to a number of revolutions and fractions thereof that said rotary electric stepper motor is driven through, to said position control computer;

(h) each of said threaded shafts of said positioning actuators has a constant thread pitch;

(i) said computer program product embodied in computer readable medium causes said position control computer to perform the steps of:
  i) upon initiation of operation of said computer program, positioning each position adjustable control pedal in a home position for which position coordinates are known, by activating each motivating device of said positioning actuators in a predetermined direction until each respective slideably engaged slider component and reactor component reach a relative position at an outer bound of said intended range of relative positions for each respective slideably engaged slider component and reactor component and said one or more adjustment limiting systems of said control pedal assembly disables activation of each of said motivating devices in said predetermined direction;
  ii) subsequently calculating, based upon said electrical signals, that said rotary electric stepper motor transmits to said position control computer, related to a number of revolutions and fractions thereof that said rotary electric stepper motor is driven through, the total number of revolutions and fractions thereof that each rotary electric stepper motor has been driven in each direction since said position adjustable control pedals were located at said home position;
  iii) calculating, based upon a total number of revolutions of each rotary electric stepper motor in each direction and said constant thread pitch of each respective threaded shaft, a total displacement of each position adjustable control pedal in each direction from said home position; and
  iv) calculating, based upon a total displacement of each position adjustable control pedal in each direction and position coordinates of said home position, current position coordinates of each position adjustable control pedal.

18. A vehicle, comprising:

(a) a frame;

(b) a suspension, for supporting said vehicle, engaged to said frame;

(c) a drivetrain, for motivating said vehicle, engaged to said frame and said suspension;

(d) an operator cabin, from which an operator operates said vehicle, engaged to said frame;

(e) wherein said operator cabin is comprised of a dash panel disposed at a forward side of said operator cabin;

(f) a control pedal assembly;

(g) wherein said control pedal assembly is comprised of a pedal mounting system base component which is either directly or indirectly engaged to said dash panel or is a same component as said dash panel;

(h) wherein said control pedal assembly is further comprised of a first series of slider components and reactor components mounted to said pedal mounting system base component;

(i) wherein said control pedal assembly is further comprised of a first position adjustable control pedal mounted to said first series of slider components and reactor components;

(j) wherein said first series of slider components and reactor components is comprised of a first slider component, a first reactor component, a second slider component, and a second reactor component;

(k) wherein said first slider component and said first reactor component are constructed and slideably engaged to one another in a manner such that relative translation between said first slider component and said first reactor component is only allowed along a first adjustment curve;

(l) wherein said first reactor component is either fixedly engaged to or is a same component as said second slider component;

(m) wherein said second slider component and said second reactor component are constructed and slideably engaged to one another in a manner such that relative translation between said second slider component and said second reactor component is only allowed along a second adjustment curve;

(n) wherein said first position adjustable control pedal is engaged to said first slider component in a manner preventing any substantial relative motion between said first slider component and said first position adjustable control pedal other than operational motions of said first position adjustable control pedal;

(o) wherein said second reactor component is engaged to said pedal mounting system base component;

(p) wherein said first slider component, said first reactor component, said second slider component, and said second reactor component are constructed and engaged to one another in an orientation such that said first adjustment curve extends in different directions than said second adjustment curve so that an initial position of said first position adjustable control pedal relative to said pedal mounting system base component is adjustable in at least two directions;

(q) wherein said control pedal assembly is further comprised of a second series of slider components and reactor components which is mounted to said pedal mounting system base component;

(r) wherein said control pedal assembly is further comprised of a second position adjustable control pedal mounted to said second series of slider components and reactor components;

(s) wherein said second series of slider components and reactor components is comprised of a third slider component and a third reactor component;

(t) wherein said third slider component and said third reactor component are constructed and slideably engaged to one another in a manner such that relative translation between said third slider component and said third reactor component is only allowed along a third adjustment curve;

(u) wherein said second position adjustable control pedal is engaged to said third slider component in a manner preventing any substantial relative motion between said third slider component and said second position adjustable control pedal other than operational motions of said second position adjustable control pedal;

(v) wherein said third reactor component is engaged directly or indirectly to said pedal mounting system base component; and (w) wherein said first slider component is moveable along said first adjustment curve completely independently of said third slider component which is moveable along said third adjustment curve completely independently of said first slider component such that said initial position of said first position adjustable control pedal is adjustable relative to and independent of an initial position of said second position adjustable control pedal in at least one direction.

19. The vehicle of claim 18, wherein:

(a) said second series of slider components and reactor components is further comprised of a fourth slider component, and a fourth reactor component;

(b) said third reactor component is either fixedly engaged to or is a same component as said fourth slider component;

(c) said fourth slider component and said fourth reactor component are constructed and slideably engaged to one another in a manner such that relative translation between said fourth slider component and said fourth reactor component is only allowed along a fourth adjustment curve;

(d) said fourth reactor component is engaged to said pedal mounting system base component; and (e) said third slider component, said third reactor component, said fourth slider component, and said fourth reactor component are constructed and engaged to one another in an orientation such that said third adjustment curve extends in different directions than said fourth adjustment curve so that said initial position of said second position adjustable control pedal relative to said pedal mounting system base component is adjustable in at least two directions.

20. The Vehicle of claim 19, wherein:

(a) said control pedal assembly is further comprised of a plurality of positioning actuators each of which is engaged to a respective slider component and a respective reactor component of a pair of a slider component and a reactor component that are slideably engaged;

(b) each of said positioning actuators is comprised of a motivating device and connecting linkages;

(c) when said motivating device of each positioning actuator is activated said positioning actuator applies a sliding force to said respective slider component in a direction substantially parallel to a respective adjustment curve of said pair of a slider component and a reactor component that are slideably engaged;

(d) when said motivating device of each positioning actuator is activated, said positioning actuator applies a reaction force to said respective reactor component, of said pair of a slider component and a reactor component that are slideably engaged, in a direction substantially opposite to said sliding force;

(e) said control pedal assembly is further comprised of one or more position control apparatus to one of which each of said positioning actuators is linked; and (f) each of said one or more position control apparatus are constructed and linked to said positioning actuators in a manner such that a user of said control pedal assembly can operate said one or more position control apparatus to activate said positioning actuators and alter a position of one or more of said position adjustable control pedals.

21. The vehicle of claim 20, wherein:

(a) one or more slide members are engaged to said slider component;

(b) said reactor component, of each pair of a slider component and a reactor component that are slideably engaged, defines for each slide member that is engaged to said slider component a complimentary slide recess within which each slide member that is engaged to said slider component is disposed;

(c) a respective one of the adjustment curves is defined parallel to one or more slide recess central axes of each pair of a slider component and a reactor component that are slideably engaged.

22. The Vehicle of claim 21, wherein:

(a) said first series of slider components and reactor components is further comprised of a fifth slider component and a fifth reactor component;

(b) said second reactor component is either fixedly engaged to or is a same component as said fifth slider component;

(c) said fifth slider component and said fifth reactor component are constructed and slideably engaged to one another in a manner such that relative translation between said fifth slider component and said fifth reactor component is only allowed along a fifth adjustment curve;

(d) said fifth reactor component is fixedly engaged to or is a same component as said pedal mounting system base component;

(e) said first slider component, said first reactor component, said second slider component, said second reactor component, said fifth slider component, and said fifth reactor component are constructed and engaged to one another in an orientation such that said fifth adjustment curve extends in different directions than either of said first adjustment curve and said second adjustment curve so that said initial position of said first position adjustable control pedal relative to said pedal mounting system base component is adjustable in at least three directions;

(f) said second series of slider components and reactor components is further comprised of a sixth slider component and a sixth reactor component;

(g) said fourth reactor component is either fixedly engaged to or is a same component as said sixth slider component;

(h) said sixth slider component and said sixth reactor component are constructed and slideably engaged to one another in a manner such that relative translation between said sixth slider component and said sixth, reactor component is only allowed along a sixth adjustment curve;

(i) said sixth reactor component is fixedly engaged to said pedal mounting system base component; and (j) said third slider component, said third reactor component, said fourth slider component, said fourth reactor component, said sixth slider component, and said sixth reactor component are constructed and engaged to one another in an orientation such that said sixth adjustment curve extends in different directions than either of said third adjustment curve and said fourth adjustment curve so that an initial position of said second position adjustable control pedal relative to said pedal mounting system base component is adjustable in at least three directions.

23. The vehicle of claim 22, wherein:

(d) said motivating device of each respective positioning actuator is comprised of a rotary electric servomotor;

(e) said connecting linkages of each respective positioning actuator are comprised of a threaded shaft and a driven nut;

(f) said rotary electric servomotor is operably connecting a slider component and a reactor component of a respective pair of a slider component and a reactor component that are slideably engaged;

(d) said threaded shaft is engaged to an output shaft of said rotary electric servomotor;

(e) said threaded shaft is threadingly engaged to a threaded bore of said driven nut;

(f) said rotary electric servomotor is linked to one or more of said position control apparatus which are constructed in a manner such that an operator can utilize said position control apparatus to activate said rotary electric servomotor and selectively cause clockwise or counterclockwise rotation of said output shaft of said rotary electric servomotor; and (g) when said rotary electric servomotor is activated and said output shaft of said respective rotary electric servomotor rotates said threaded shaft is driven rotationally, said respective driven nut is driven along said respective threaded shaft, said sliding force and said reaction force are applied to said slider component and said reactor component respectively, and said slideably engaged slider component and reactor component translate relative to one another along a respective adjustment curve.

24. The Vehicle of claim 23, further comprising:

(a) a first pedal driven component engaged to said first position adjustable control pedal and said first slider component; and (b) a second pedal driven component engaged to said second position adjustable control pedal and said third slider component.

25. The vehicle of claim 24, wherein:

(a) each of said first slider component, said second slider component, said third slider component, said fourth slider component, said fifth slider component and said sixth slider component are engaged to other slider components of said control pedal assembly only through intermediate engagement to reactor components of said control pedal assembly; and (b) said initial position of said first position adjustable pedal is adjustable relative to and independent of said initial position of said second position adjustable control pedal in at least three directions.

26. The vehicle of claim 25, wherein:

(a) said first pedal driven component is a pedal position sensor which is linked to an electronic engine controller of said vehicle and relays signals to said electronic engine controller related to a position of said first position adjustable pedal relative to said first slider component;

(b) wherein said first pedal driven component is flexibly linked to said electronic engine controller of said vehicle such that said first position adjustable control pedal and said pedal position sensor remain functional regardless of where an operator adjusts said initial position of said first position adjustable control pedal;

(c) said second pedal driven component is either a hydraulic master cylinder or a fluid control valve that is linked to a braking system of said vehicle; and (d) wherein said second pedal driven component is flexibly linked to said braking system of said vehicle such that said second position adjustable control pedal and said second pedal driven component remain functional regardless of where an operator adjusts said initial position of said second position adjustable control pedal.

27. The vehicle of claim 26, wherein:

(a) said each pair of a slider component and a reactor component that are slideably engaged is comprised of only .one slide member engaged to said slider component;

(b) each reactor component, of said each pair of a slider component and a reactor component that are slideably engaged, defines an only slide recess of each slideably engaged slider component and reactor component;

(c) said slide recess central axes of each slide recess is a straight line and thus a respective adjustment curve of each pair of a slider component and a reactor component that are slideably engaged is a straight line;

(d) said slider components and said reactor components of said first series of slider components and reactor components are constructed and engaged to one another in an orientation such that said slide recess central axes of each slideably engaged slider component and reactor component of said first series of slider components and reactor components are disposed substantially perpendicular the slide recess central axes of all other slideably engaged slider components and reactor components of said first series of slider components and reactor components;

(e) said slider components and said reactor components of said second series of slider components and reactor components are constructed and engaged to one another in an orientation such that said slide recess central axes of each slideably engaged slider component and reactor component of said second series of slider components and reactor components are disposed substantially perpendicular to the slide recess central axes of all other slideably engaged slider components and reactor components of said second series of slider components and reactor components;

(f) each rotary electric servomotor of, each positioning actuator of said control pedal assembly is fixedly engaged to an end portion of a reactor component with said output shaft of each rotary electric servo motor disposed substantially parallel to slide recess central axes of slide recesses defined by said reactor component to which each rotary electric servomotor is fixedly engaged; and (g) each driven nut is fixedly engaged to a slider component with a bore axis of each threaded bore of each driven nut disposed substantially parallel to slide member central axes of slide members that are engaged to said slider component to which said each driven nut is fixedly engaged to.

28. The vehicle of claim 27, further comprising:

(a) a third series of slider components and reactor components mounted to said pedal mounting system base component;

(b) a third position adjustable control pedal mounted to said third series of slider components and reactor components;

(c) wherein said third series of slider components and reactor components is comprised of a seventh slider component, a seventh reactor component, an eighth slider component, an eighth reactor component, a ninth slider component, and a ninth reactor component;

(d) wherein said seventh slider component and said seventh reactor component are constructed and slideably engaged to one another in a manner such that relative translation between said seventh slider component and said seventh reactor component is only allowed along a seventh adjustment curve;

(e) wherein said seventh reactor component is either fixedly engaged to or is one and a same component as said eighth slider component;

(f) wherein said eighth slider component and said eighth reactor component are constructed and slideably engaged to one another in a manner such that relative translation between said eighth slider component and said eighth reactor component is only allowed along an eighth adjustment curve;

(g) wherein said eighth reactor component is either fixedly engaged to or is a same component as said ninth slider component;

(h) wherein said ninth slider component and said ninth reactor component are constructed and slideably engaged to one another in a manner such that relative translation between said ninth slider component and said ninth reactor component is only allowed along a ninth adjustment curve;

(i) wherein said third position adjustable control pedal is engaged to said seventh slider component in a manner preventing any substantial relative motion between said seventh slider component and said third position adjustable control pedal other than operational motions of said third position adjustable control pedal;

(j) wherein said ninth reactor component is fixedly engaged to said pedal mounting system base component; and (k) wherein said seventh slider component, said seventh reactor component, said eighth slider component, said eighth reactor component, said ninth slider component, and said ninth reactor component are constructed and engaged to one another in an orientation such that said seventh adjustment curve, said eighth adjustment curve, and said ninth adjustment curve each extend in different directions relative to one another so that an initial position of said third position adjustable control pedal relative to said pedal mounting system base component is adjustable in at least three directions.

29. The vehicle of claim 20, wherein:

(a) said one or more position control apparatus are comprised of a position control computer that is controllably linked to one or more of said one or more positioning actuators;

(b) said position control computer operates according to an algorithm encoded in a computer program which is embodied in a computer readable medium;

(c) said computer program causes said position control computer to perform the steps of:
  i) determining position coordinates of each of said position adjustable control pedals;
  ii) displaying said position coordinates of each of said position adjustable control pedals so that a user of said position control computer may be aware of said position coordinates of each of said position adjustable control pedals;
  iii) upon a user acting upon computer control devices of said position control computer in a certain manner, activating one or more of. said motivating devices of said positioning actuators to slideably drive a respective one or more of said slider components relative to said reactor components that they are slideably engaged to until said user stops acting upon said computer control devices in said certain manner; and
  iv) receiving input from said user related to position coordinates that said user would like each position adjustable control pedal to be located at and subsequently, upon being commanded to do so by said user, activating various of said motivating devices of said control pedal assembly until position coordinates of each position adjustable control pedal are equal to said position coordinates input by said user.

30. The vehicle of claim 29, wherein:

(a) said computer program product embodied in computer readable medium causes said position control computer to further perform the steps of:
  i) receiving from a user of said position control computer one or more control pedal position profiles and an equal number of associated control pedal position profile names;
  ii) storing each of said control pedal position profiles and each associated control pedal position profile name received from said user of said position control computer in computer memory in a linked manner; and
  iii) upon a user of said position control computer selecting a control pedal position profile name and commanding said position control computer to drive said position adjustable control pedals to position coordinates of an associated control pedal position profile, activating various of said motivating devices of positioning actuators until each position adjustable control pedal is located in a position such that its position coordinates are equal to those of said control pedal position profile associated with said control pedal position profile name selected by said user.

31. The vehicle of claim 30, wherein:
(a) upon initiation of a survey mode of operation of said computer program by a user and before termination of said survey mode of operation of said computer program by said user, said computer program product embodied in computer readable medium causes said position control computer to perform the steps of:
  i) prompting the user for profile information of a current survey participant;
  ii) upon entry of profile information of said current survey participant, and subsequently being commanded by said user to store said profile information, storing said profile information of said current survey participant in computer memory;
  iii) prompting a user to select one of a plurality of said control pedal position profile names;
  iv) after said user selects a control pedal position profile name, activating variously motivating devices until position coordinates of said position adjustable control pedals are equal to position coordinates of a control pedal position profile associate with said control pedal position profile name that was selected by said user;
  v) prompting said user for comments and/or scoring from said current survey participant related to said control pedal position profile associated with said control pedal position profile name that said user has selected;
  vi) upon entry of said comments and/or scoring from said current survey participant and subsequently being commanded by said user to store said comments and/or scoring, storing in computer memory said comments and/or scoring from said current survey participant;
  vii) repeating steps iii through vi until each one of a select set of control pedal position profiles that are stored in computer memory have been studied by said current survey participant or until said user of said position control computer commands said position control computer to advance to a next survey participant; and
  viii) repeating steps i through vii until said user of said position control computer chooses to terminate operation of said survey mode of said computer program.

32. The vehicle of claim 31, wherein:
(a) said control pedal assembly is further comprised of one or more adjustment limiting systems;
(b) said one or more adjustment limiting systems are each comprised of one or more limit switches engaged to one or more of said reactor components and/or one or more of said slider components of said control pedal assembly;
(c) said limit switches are electrically linked either directly or indirectly to one or more of said positioning actuators and/or one or more of said position control apparatus;
(d) each of said one or more adjustment limiting systems are constructed and engaged to said control pedal assembly in a manner such that when each respective slideably engaged slider component and reactor component are positioned relative to one another within a respective intended range of relative positions, activation of each respective positioning actuator that is engaged to each respective slideably engaged slider component and reactor component is enabled in either direction;
(e) each of said one or more adjustment limiting systems are constructed and engaged to said control pedal assembly in a manner such that when a respective slideably engaged slider component and reactor component are slideably driven by a respective positioning actuator to a relative position that is at an outer bound of said respective intended range of relative positions a respective adjustment limiting system disables activation of said respective positioning actuator in said direction that said positioning actuator slideably drove said respective slideably engaged slider component and reactor component to a relative position at an outer bound of said respective intended range of relative positions, thus, said adjustment limiting system disables said respective positioning actuator from slideably driving said respective slideably engaged slider component and reactor component from a relative position at an outer bound of said respective intended range of relative positions to a relative position outside said respective intended range of relative positions;
(f) each of said one or more rotary electric servomotor is a rotary electric stepper motor;
(g) each rotary electric stepper motor is constructed and electrically linked to said position control computer in a manner such that each rotary electric stepper motor transmits signals to said position control computer related to a number of revolutions and fractions thereof that said rotary electric stepper motor is driven through;
(h) each of said threaded shafts of said positioning actuators has a constant thread pitch;
(i) said computer program product embodied in computer readable medium causes said position control computer to perform the steps of:
  i) upon initiation of operation of said computer program, positioning each position adjustable control pedal in a home position, for which position coordinates are known, by activating each motivating device of said positioning actuators in a predetermined direction until each respective slideably engaged slider component and reactor component reach a relative position at an outer bound of said intended range of relative positions for each respective slideably engaged slider component and reactor component and said one or more adjustment limiting systems of said control pedal assembly disable activation of each of said motivating devices in said predetermined direction;
  ii) subsequently calculating, based upon said electrical signals said rotary electric stepper motor transmits to said position control computer related to a number of revolutions and fractions thereof that said rotary electric stepper motor is driven through, the total number of revolutions and fractions thereof that each rotary electric stepper motor has been driven in each direction since said position adjustable control pedals were located at said home position;
  iii) calculating, based upon a total number of revolutions of each rotary electric stepper motor in each direction and said constant thread pitch of each respective threaded shaft, a total displacement of each position adjustable control pedal in each direction from said home position; and
  iv) calculating, based upon a total displacement of each position adjustable control pedal in each direction and position coordinates of said home position, current position coordinates of each position adjustable control pedal.

* * * * *